US012694114B2

(12) United States Patent
Gisolfi et al.

(10) Patent No.: US 12,694,114 B2
(45) Date of Patent: Jul. 28, 2026

(54) COMPUTER SYSTEMS AND METHODS FOR SCORING AND MANAGING DIGITAL CONTENT

(71) Applicant: Capital One Financial Corporation, McLean, VA (US)

(72) Inventors: Daniel A. Gisolfi, Hopewell Junction, NY (US); Douglas Brian Scamahorn, Noblesville, IN (US); Bruce Clavey, Round Rock, TX (US); Lise W. Noble, Chapel Hill, NC (US)

(73) Assignee: Capital One Financial Corporation, McLean, VA (US)

( * ) Notice: Subject to any disclaimer, the term of this patent is extended or adjusted under 35 U.S.C. 154(b) by 128 days.

(21) Appl. No.: 18/400,470

(22) Filed: Dec. 29, 2023

(65) Prior Publication Data

US 2025/0217487 A1 Jul. 3, 2025

(51) Int. Cl.
_G06F 21/57_ (2013.01)

(52) U.S. Cl.
CPC ................................... _G06F 21/57_ (2013.01)

(58) Field of Classification Search
CPC ....................................................... G06F 21/57
See application file for complete search history.

(56) References Cited

U.S. PATENT DOCUMENTS

| | | | |
|---|---|---|---|
| 7,822,631 B1 | 10/2010 | Vander Mey et al. | |
| 7,953,979 B2 | 5/2011 | Borneman et al. | |
| 8,131,705 B2 | 3/2012 | Chevalier et al. | |
| 8,533,013 B2 | 9/2013 | Cole | |
| 8,566,262 B2 | 10/2013 | Deyo | |
| 9,123,001 B2 | 9/2015 | Skelton | |
| 9,176,957 B2 | 11/2015 | Myslinski | |
| 9,710,785 B2 | 7/2017 | Miller et al. | |
| 10,275,779 B2 | 4/2019 | Papa et al. | |
| 10,915,539 B2 | 2/2021 | Motte et al. | |
| 11,328,034 B2 | 5/2022 | Childress et al. | |
| 11,526,675 B2 | 12/2022 | Ghulati | |
| 2005/0251399 A1* | 11/2005 | Agarwal | G06F 16/958 705/26.1 |
| 2017/0270537 A1 | 9/2017 | Papa et al. | |
| 2019/0082224 A1 | 3/2019 | Bradley et al. | |
| 2020/0202071 A1 | 6/2020 | Ghulati | |
| 2021/0019339 A1 | 1/2021 | Ghulati et al. | |

(Continued)

*Primary Examiner* — Beemnet W Dada
(74) *Attorney, Agent, or Firm* — Lee Sullivan Shea & Smith LLP

(57) ABSTRACT

A computing platform may be installed with software technology for scoring and managing digital content that configures the computing platform to: (i) cause a client device to present a user interface for creating a scoring model for content hosted within a content management system (CMS); (ii) receive data defining a given scoring model that is configured to output a trustworthiness score for a piece of content based on an evaluation of data for a given set of input variables; (iii) use the given scoring model to evaluate a given piece of content hosted within the CMS by (a) obtaining data for the given set of input variables and (b) inputting the obtained data into the scoring model and thereby determine a given trustworthiness score for the given piece of content; and (iv) based on the given trustworthiness score for the given piece of content, manage the given piece of content.

20 Claims, 11 Drawing Sheets

(56) References Cited

U.S. PATENT DOCUMENTS

| | | | |
|---|---|---|---|
| 2021/0266176 A1* | 8/2021 | Kapinos | ................ H04L 9/3239 |
| 2021/0312555 A1 | 10/2021 | Papa et al. | |
| 2024/0160765 A1* | 5/2024 | Moresmau | .......... G06F 21/6218 |
| 2025/0007950 A1* | 1/2025 | Wuest | ................ H04L 63/1483 |

* cited by examiner

| Variable | Weight | Value | Weighted Value | Output Score |
|---|---|---|---|---|
| 1 | 20% | 10 | 2 | 6 |
| 2 | 30% | 5 | 1.5 | |
| 3 | 10% | 8 | 0.8 | |
| 4 | 10% | 2 | 0.2 | |
| 5 | 30% | 5 | 1.5 | |

400
402 404 406 408 410

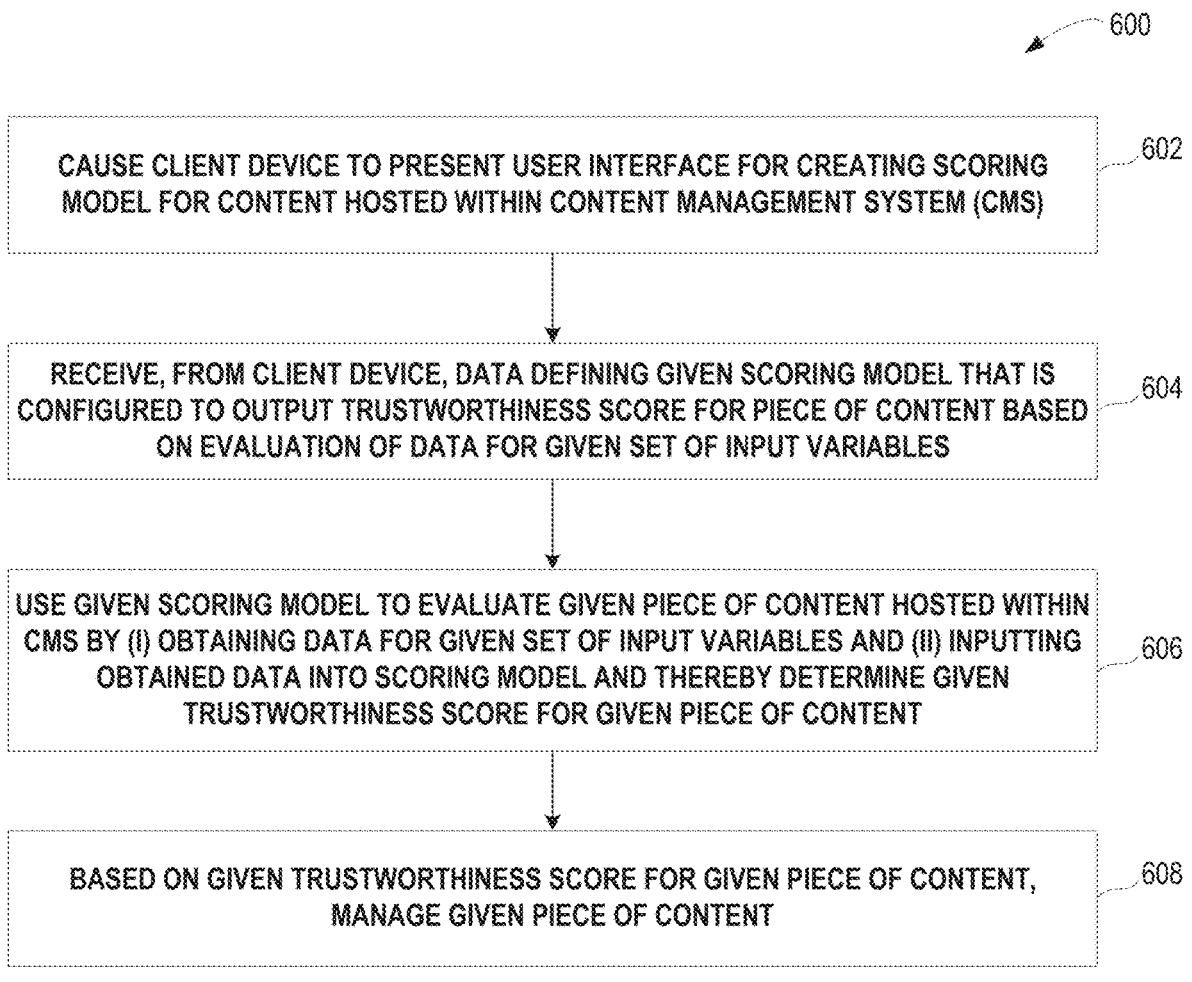

600

CAUSE CLIENT DEVICE TO PRESENT USER INTERFACE FOR CREATING SCORING MODEL FOR CONTENT HOSTED WITHIN CONTENT MANAGEMENT SYSTEM (CMS) — 602

RECEIVE, FROM CLIENT DEVICE, DATA DEFINING GIVEN SCORING MODEL THAT IS CONFIGURED TO OUTPUT TRUSTWORTHINESS SCORE FOR PIECE OF CONTENT BASED ON EVALUATION OF DATA FOR GIVEN SET OF INPUT VARIABLES — 604

USE GIVEN SCORING MODEL TO EVALUATE GIVEN PIECE OF CONTENT HOSTED WITHIN CMS BY (I) OBTAINING DATA FOR GIVEN SET OF INPUT VARIABLES AND (II) INPUTTING OBTAINED DATA INTO SCORING MODEL AND THEREBY DETERMINE GIVEN TRUSTWORTHINESS SCORE FOR GIVEN PIECE OF CONTENT — 606

BASED ON GIVEN TRUSTWORTHINESS SCORE FOR GIVEN PIECE OF CONTENT, MANAGE GIVEN PIECE OF CONTENT — 608

FIG. 6

COMPUTER SYSTEMS AND METHODS FOR SCORING AND MANAGING DIGITAL CONTENT

BACKGROUND

Various organizations utilize a content management system (CMS) to manage digital content, which may involve, for instance, developing, publishing, and archiving content. In some examples, a CMS is used for enterprise content management (ECM) or web content management (WCM). Existing content management processes associated with CMSs typically rely on individuals (e.g., content managers and/or editors) applying policies to maintain standards and trustworthiness of content hosted within a CMS.

OVERVIEW

Disclosed herein is new software technology for scoring and managing digital content hosted within a content management system (CMS).

In one aspect, the disclosed technology may take the form of a method carried out by a computing platform that involves: (i) causing a client device to present a user interface for creating a scoring model for content hosted within a CMS; (ii) receiving, from the client device, data defining a given scoring model that is configured to output a trustworthiness score for a piece of content based on an evaluation of data for a given set of input variables; (iii) using the given scoring model to evaluate a given piece of content hosted within the CMS by (a) obtaining data for the given set of input variables and (b) inputting the obtained data into the scoring model and thereby determining a given trustworthiness score for the given piece of content; and (iv) based on the given trustworthiness score for the given piece of content, managing the given piece of content.

In an example, the given set of input variables comprises one or more of: (i) one or more variables indicating information derived from the given piece of content itself; (ii) one or more variables indicating information derived from user feedback; (iii) one or more variables indicating information derived based on an author of the given piece of content; (iv) one or more variables indicating information derived from other content hosted within the CMS; or (v) one or more variables indicating information derived using an application programming interface (API).

In an example, managing the given piece of content based on the given trustworthiness score for the given piece of content comprises determining whether to advance the given piece of content from a current lifecycle stage to a subsequent lifecycle stage.

In an example, the scoring model's evaluation of data for the given set of input variables involves applying a corresponding weight to each of the input variables of the given set of input variables.

In an example, the method further involves, prior to using the given scoring model to evaluate the given piece of content hosted within the CMS, transmitting, to a second client device, a data communication regarding the given piece of content and thereby causing the given piece of content to be presented by the second client device together with graphical user interface (GUI) elements that allow a user of the second client device to provide feedback regarding the given piece of content.

In an example, the scoring model is defined for use with a particular category of content that is hosted within the CMS.

In an example, the scoring model is defined for use with content at a given lifecycle stage within the CMS.

In an example, the method further involves, after using the given scoring model to evaluate the given piece of content and thereby determining the given trustworthiness score for the given piece of content: (i) using the given scoring model to reevaluate the given piece of content hosted within the CMS and thereby determining an updated given trustworthiness score for the given piece of content; and (ii) based on the updated given trustworthiness score for the given piece of content, further managing the given piece of content.

In an example, the method further involves transmitting, to a second client device, a data communication indicating a change in the given trustworthiness score.

In an example, the method further involves transmitting, to a second client device, a data communication regarding the given piece of content and thereby causing the given trustworthiness score to be presented by the second client device together with the given piece of content.

In an example, the method further involves exposing the given trustworthiness score via an application programming interface (API).

In an example, the method further involves using the trustworthiness score as a basis for determining an eminence score for an author of the given piece of content.

In an example, the method further involves defining one or more rules associated with managing digital content based on trustworthiness scores output by the given scoring model, and wherein managing the given piece of content based on the given trustworthiness score for the given piece of content comprises managing the given piece of content in accordance with one or more of the defined one or more rules.

In yet another aspect, disclosed herein is a computing platform that includes a communication interface, at least one processor, at least one non-transitory computer-readable medium, and program instructions stored on the at least one non-transitory computer-readable medium that are executable by the at least one processor to cause the computing platform to carry out the functions disclosed herein, including but not limited to the functions of the foregoing method.

In still another aspect, disclosed herein is a non-transitory computer-readable medium provisioned with program instructions that, when executed by at least one processor, cause a computing platform to carry out the functions disclosed herein, including but not limited to the functions of the foregoing method.

One of ordinary skill in the art will appreciate these as well as numerous other aspects in reading the following disclosure.

BRIEF DESCRIPTION OF THE DRAWINGS

FIG. 6 depicts a flow diagram of an example functionality for scoring and managing digital content, according to aspects of the disclosed technology.

Figure 1:
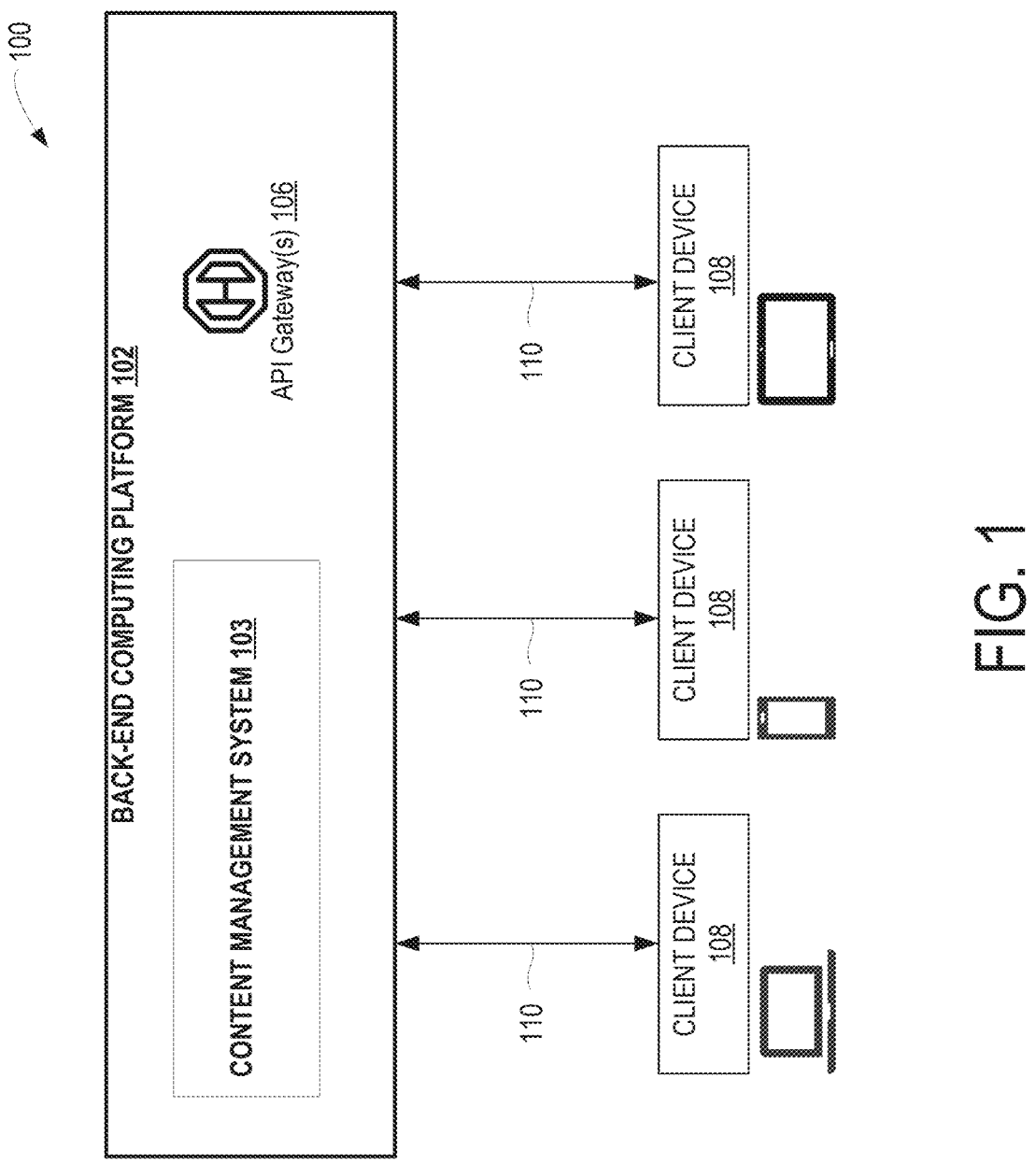
FIG. 1 depicts an example network environment including an example computing platform operated by an organization.

Features, aspects, and advantages of the presently disclosed technology may be better understood with regard to the following description, appended claims, and accompanying drawings, as listed below. The drawings are for the purpose of illustrating example embodiments, but those of ordinary skill in the art will understand that the technology disclosed herein is not limited to the arrangements and/or instrumentality shown in the drawings.

DETAILED DESCRIPTION

As noted above, various organizations utilize a content management system (CMS) to manage digital content (which may also be referred to herein as "content"), which may involve tasks such as developing, publishing, and archiving content. CMSs may help organizations to organize and facilitate collaborative content creation and content publication. A CMS is typically hosted on a computing platform that is operated by an organization and is accessible by users over a data network such as the Internet.

To illustrate with an example, FIG. 1 depicts a network environment 100 in which a CMS may be operated and used. As shown, the network environment 100 includes an example back-end computing platform 102 operated by an organization along with three example client devices 108 that may each be configured to access and interact with back-end computing platform 102.

As shown in FIG. 1, back-end computing platform 102 may be hosting a CMS 103 for an organization (e.g., a corporation). CMS 103 may be any suitable CMS for managing digital content for the organization. In some scenarios, CMS 103 is used for enterprise content management (ECM) and/or web content management (WCM). For instance, in an example, CMS 103 may be an ECM that hosts content for an intranet for the organization. However, other examples are possible as well.

In general, there may be various users that utilize and interact with CMS 103. For instance, in an example, the users of back-end computing platform 102 may include content managers associated with the organization that manage content within the CMS, editors of content within CMS 103, readers of content within CMS 103, and/or authors of content within the CMS, among other possibilities.

Further, in general, CMS 103 may provide any of various functionality related to management of digital content, which may include functionality for facilitating ideation of pieces of content, facilitating creation of pieces of content, facilitating editing of pieces of content, storing pieces of content, publishing pieces of content, and/or archiving pieces of content, among other possibilities.

As shown, back-end computing platform 102 may also include one or more API gateways 106 that may each function to communicate with one or more external systems via one or more APIs of back-end computing platform 102.

In practice, back-end computing platform 102 may take the form of one or more computing systems that collectively comprise some set of physical computing resources (e.g., processors, data storage, etc.) that are configured to run the software subsystems discussed herein, among various other software subsystems that may be hosted and run by back-end computing platform 102. This set of physical computing resources may take any of various forms. As one possibility, back-end computing platform 102 may comprise cloud computing resources that are supplied by a third-party provider of "on demand" cloud computing resources, such as Amazon Web Services (AWS), Amazon Lambda, Google Cloud Platform (GCP), Microsoft Azure, or the like. As another possibility, back-end computing platform 102 may comprise "on-premises" computing resources of the organization that operates the example back-end computing platform 102 (e.g., organization-owned servers). As yet another possibility, the example back-end computing platform 102 may comprise a combination of cloud computing resources and on-premises computing resources. Other implementations of back-end computing platform 102 are possible as well.

Further, in practice, CMS 103 may be implemented using any of various software architecture styles, examples of which may include a microservices architecture, a service-oriented architecture, and/or a serverless architecture, among other possibilities, as well as any of various deployment patterns, examples of which may include a container-based deployment pattern, a virtual-machine-based deployment pattern, and/or a Lambda-function-based deployment pattern, among other possibilities.

Further yet, although not shown in FIG. 1, CMS 103 may interact with a data storage layer of back-end computing platform 102, which may comprise data stores of various different forms, examples of which may include relational databases (e.g., Online Transactional Processing (OLTP) databases), NoSQL databases (e.g., columnar databases, document databases, key-value databases, graph databases, etc.), file-based data stores (e.g., Hadoop Distributed File System), object-based data stores (e.g., Amazon S3), data warehouses (which could be based on one or more of the foregoing types of data stores), data lakes (which could be based on one or more of the foregoing types of data stores), message queues, or streaming event queues, among other possibilities.

Back-end computing platform 102 may comprise various other components and take various other forms as well.

As noted above, example network environment 100 may also include three example client devices 108 that may be utilized by users of CMS 103 (e.g., authors, content managers, editors, readers, etc.) to access and interact with back-end computing platform 102. In this respect, each client device 108 may include hardware components such as one or more processors, computer-readable mediums, communication interfaces, and input/output (I/O) components (or interfaces for connecting thereto), among other possible hardware components, as well as software that facilitates the client device's ability to interact with back-end computing platform 102 in order to access CMS 103 hosted by back-end computing platform 102 (e.g., operating system software, web browser software, a mobile application, etc.). As representative examples, each client device 108 may take the form of a computing device such as a desktop computer, a laptop, a netbook, a tablet, a smartphone, or a personal digital assistant (PDA), among other possibilities.

As further shown in FIG. 1, back-end computing platform 102 may be configured to interact with client devices 108 over respective network-based communication paths 110. In this respect, each respective communication path 110 between back-end computing platform 102 and a client device 108 may generally comprise one or more data networks and/or data links, which may take any of various forms. For instance, each respective communication path 110 may include any one or more of Personal Area Networks (PANs), Local-Area Networks (LANs), Wide-Area Networks (WANs) such as the Internet or cellular networks, cloud networks, and/or point-to-point links, among other possibilities. Further, the data networks and/or links that make up each respective communication path 110 may be wireless, wired, or some combination thereof, and may carry data according to any of various different communication protocols. Additionally, the communication between back-end computing platform 102 and each client device 108 may be carried out via one or more APIs provided by back-end computing platform 102, among other possibilities. Although not shown, the respective communication paths 110 between client devices 108 and back-end computing platform 102 may also include one or more intermediate systems. For example, it is possible that back-end computing platform 102 may communicate with a given client device 108 via one or more intermediary systems, such as a host server (not shown). Many other configurations are also possible.

It should be understood that network environment 100 is one example of a network environment in which a CMS may be implemented and in which embodiments described herein may be implemented. Numerous other arrangements are possible and contemplated herein. For instance, other network environments may include additional components not pictured and/or more or fewer of the pictured components. Further, in the example of FIG. 1, CMS 103 is described as being hosted on computing platform 102. However, in other examples, CMS 103 may be operated by the organization but hosted by a third-party provider of "on demand" cloud computing resources, such as a third-party cloud platform (e.g., AWS) or the like. Other examples are possible as well.

In practice, a CMS such as CMS 103 may host a wide array of digital content. As non-limiting examples, the content may include, for instance, technical articles, organizational rules, organizational regulations, video content, audio content, webpage content, and/or social media content, among other possibilities.

Further, each piece of content hosted within a CMS typically has a "content lifecycle" comprising multiple different "stages", examples of which may include ideation, planning, creation, review and approval, certification, publication, distribution, optimization and maintenance, and/or archiving, among other possibilities. As used herein, "a piece of content" refers to a piece of digital content.

The content lifecycle for different pieces of content may vary. In this regard, pieces of different types of content may have different content lifecycles. For instance, a first content lifecycle for a first type of content (e.g., a technical article such as a white paper) may be different from a second content lifecycle for a second type of content (e.g., webpage content), which may in turn be different from a third content lifecycle for a third type of content (e.g., social-media content), and so forth. Additionally or alternatively, the content lifecycles for pieces of content may vary depending on the organizations managing the content. For instance, a first content lifecycle for a given type of content (e.g., a technical article such as a white paper) managed by a first organization may be different from a second content lifecycle for the type of content managed by a second organization, which may in turn be different from a third content lifecycle for the given type of content managed by a third organization, and so forth.

In some examples, an organization may implement a phase-gate process (which may also be referred to herein as a "stage-gate process") with respect to certain content hosted within a CMS. In general, a phase-gate process is a project management technique in which an initiative, project, or content lifecycle for a piece of content (e.g., new content development, product development, software development, process improvement, business change, etc.) is divided into distinct stages or phases, separated by decision points (known as gates). At each gate, a decision is made regarding whether to continue work associated with the initiative, project, or content lifecycle, and this decision may involve one or more workflows and/or review by one or more individuals, such as a manager, steering committee, and/or governance board, among other possibilities. For instance, an organization may implement one or more workflows associated with an ideation stage for a piece of content, one or more workflows associated with a planning stage for a piece of content, one or more workflows associated with a creation stage for a piece of content, and/or one or more workflows associated with a review-and-approval stage for a piece of content review, among other possibilities. In order for a piece of content to move from one stage in the content lifecycle to the next stage in the content lifecycle, each of these one or more workflows may need to be completed. Similar to stages within content lifecycle varying on a content type-by-type basis and/or an organization-by-organization basis, the workflows associated with various stages of the content lifecycle may also vary on a content type-by-type basis and/or an organization-by-organization basis.

Figure 2:
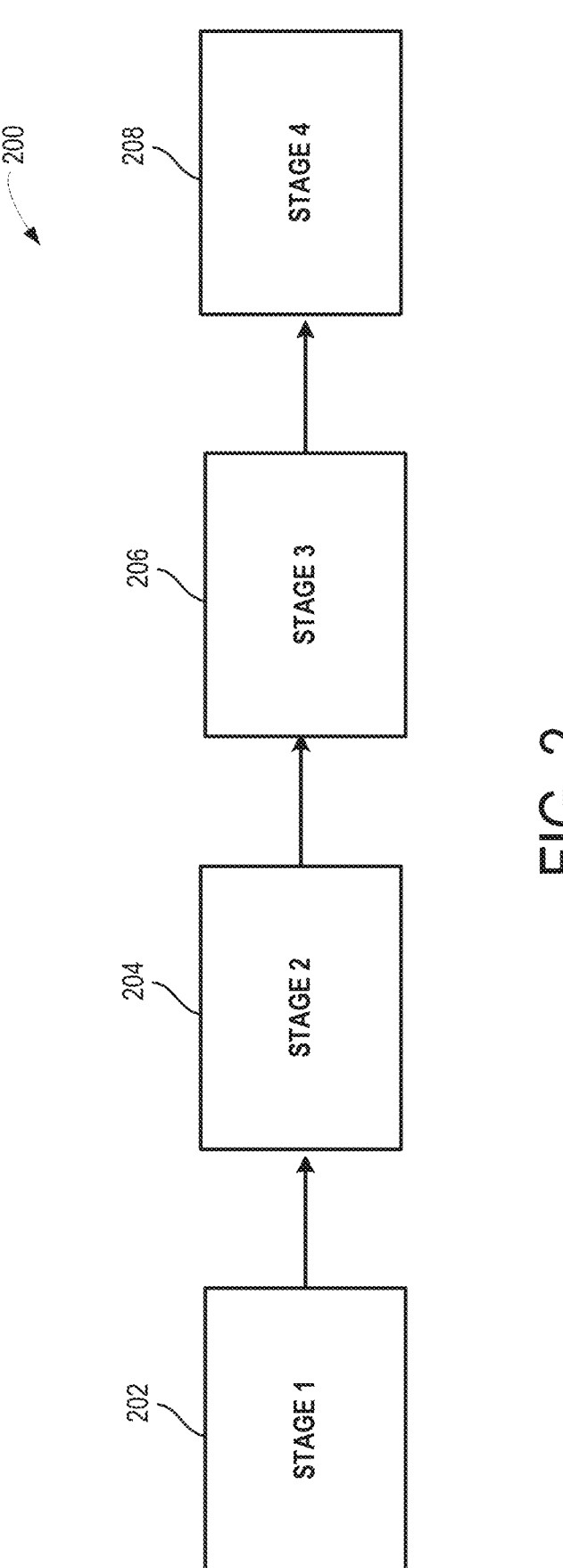
FIG. 2 depicts a conceptual illustration of how a given piece of content may flow through a content management system (CMS).

With reference to FIG. 2, an example content lifecycle for an example piece of content is illustrated. Content lifecycle 200 is shown to have a first stage 202, a second stage 204, a third stage 206, and a fourth stage 208. In a representative example, first stage 202 is an ideation stage, second stage is a creation stage, third stage 206 is a publication stage, and fourth stage 208 is an archiving stage. However, it should be understood that this is a representative example only, and fewer or additional stages and/or different stages are possible as well. Further, in some examples, at least some of these stages 202-208 for the piece of content correspond to stages of a stage-gate process implemented by the organization. Still further, at least some of the stages 202-208 may be associated with one or more workflows implemented by the organization operating the CMS.

CMSs provide a number of advantages for organizations that wish to host and manage digital content, including facilitating collaborative content ideation and creation, as well as streamlining both publishing of content to readers and archiving of content. However, existing CMSs also present a number of challenges.

One such challenge is that existing CMSs employ content management processes that rely on one or more individuals (e.g., content managers) applying procedures and/or policies to maintain CMS standards and trustworthiness of content hosted within a CMS. However, it is often not practically possible for a content manager(s) to manage all the content hosted within a CMS so as to maintain CMS standards and trustworthiness of the content. There are several reasons for this.

First, the trustworthiness of content hosted within a CMS typically depends on a wide range of different factors, and it is difficult or impossible for a content manager to objectively and consistently account for all of these factors when assessing the trustworthiness of content hosted within a CMS.

Second, the trustworthiness of content hosted within a CMS tends to change over time. For instance, content may become outdated or less relevant over time and thus may have reduced trustworthiness over time.

Third, the task of managing content becomes increasingly more difficult as content volume grows over time. For instance, CMSs for some organizations may host thousands, tens of thousands, hundreds of thousand, or more pieces of content. And as content volume grows over time, content managers may also struggle to ensure that readers are able to locate and identify content that provides source of current truth for topics of interest.

For these and other reasons, a content manager's task of managing the content within a CMS tends to be time consuming and difficult, and content managers are often overwhelmed with the tasks(s) associated with managing the content to the point that it becomes practically impossible for the content manager to maintain CMS standards and trustworthiness of the content.

Existing CMSs may also suffer from challenges related to content authors (which may also be referred to as "content creators"). For instance, in some examples, CMSs and associated authors may struggle with the establishment of initial credibility associated with release of content (e.g., an article). In this regard, readers may tend to gravitate towards content created by authors well-known to them and/or have created large amounts of content, whereas authors that are less well-known and/or have created limited pieces of content may struggle to attract readership within an organization. Authors may also struggle with both (i) determining content needs and/or desires within the organization and (ii) tailoring the content they create to those needs and/or desires within the organization. Authors may also risk their content competing against similar and/or duplicative content.

Existing CMSs may also suffer from various challenges related to readers (which may also be referred to as "content consumers"). For instance, in some examples, readers may struggle to locate and identify timely and/or relevant content for topics of interest (e.g., current source of truth for topics of interest, such as current rules and/or procedures implemented by the organization that relate to the topics of interest). Readers may also struggle with indicating (e.g., to authors) the topic(s) in which the readers are interested.

Existing CMSs may suffer from other challenges as well.

To address these and other problems, disclosed herein is new software technology for scoring and managing digital content hosted within a CMS. The new software technology allows for (i) creating and deploying scoring models that are configured to output trustworthiness scores for digital content hosted within a CMS and (ii) managing digital content based on the trustworthiness scores output by the scoring models. In this way, the disclosed technology helps to overcome the aforementioned challenges associated with existing CMSs, such as the challenges with maintaining trustworthiness of content and/or establishing credibility.

In at least some implementations, the software technology disclosed herein may embodied in the form of (i) a new software subsystem that is included as part of a CMS or otherwise interfaces with a CMS in some manner along with (ii) extensions to one or more other software subsystems of a CMS. At a high level, this new software subsystem may provide a new set of functionality for (i) enabling a user to build a given scoring model that is configured to output a trustworthiness score for a piece of content based on an evaluation of data for a given set of input variables, which may include input variables that provide information derived from the given piece of content itself, the author of the given piece of content, other content hosted within the CMS, user feedback, and/or a service that is accessed via an API, and then (ii) deploying the given scoring model for scoring a given piece of content, among other possible functionality that may be carried out by such a software subsystem in accordance with the present disclosure. In turn, the disclosed extensions to the one or more other software subsystems of the CMS may include one or more extensions that enable the CMS to manage the given piece of content based on the given trustworthiness score for the given piece of content that is output by the scoring engine, among other possible extensions to CMS functionality that may be implemented in accordance with the present disclosure.

However, it should be understood that the disclosed software technology may be embodied in various other forms as well-including but not limited to the possibility that (i) some or all of the functionality of the aforementioned new software system may be implemented in the form of extensions to other software subsystems of the CMS and/or (ii) some or all of the functionality of the aforementioned extensions may be implemented in the form of a new software subsystem.

The disclosed software technology may provide various technical improvements over existing CMSs. For example, the disclosed software technology may be configured to determine trustworthiness of content hosted within a CMS and manage content based on the determined trustworthiness. This may help content managers ensure that readers are able to locate and identify content that provides source of current truth for topics of interest (which in turn may help readers locate and identify content that provides source of current truth for topics of interest). As another example, the disclosed software technology may be configured to determine trustworthiness of content in real-time so as to account for trustworthiness of content that changes over time. As yet another example, the disclosed technology may be configured to allow a content manager to tailor both a scoring model and/or content-management rules associated with the scoring model based on type of content and/or lifecycle stage of content.

As yet another example, in at least some implementations, the disclosed software technology may be configured to aggregate user feedback related to a given piece of content and then use that aggregated user feedback to determine the trustworthiness score for the a given piece of content, which provides a way to crowdsource user feedback and may help to provide a reliable indication of trustworthiness of the content hosted within the CMS. This may help content managers and/or authors to (i) determine content needs and/or desires within the organization and (ii) tailor the content they create to those needs and/or desires within the organization. In addition, this may also help authors establish and/or improve credibility.

The disclosed software technology may provide other technical improvements over existing CMSs as well.

Figure 3:
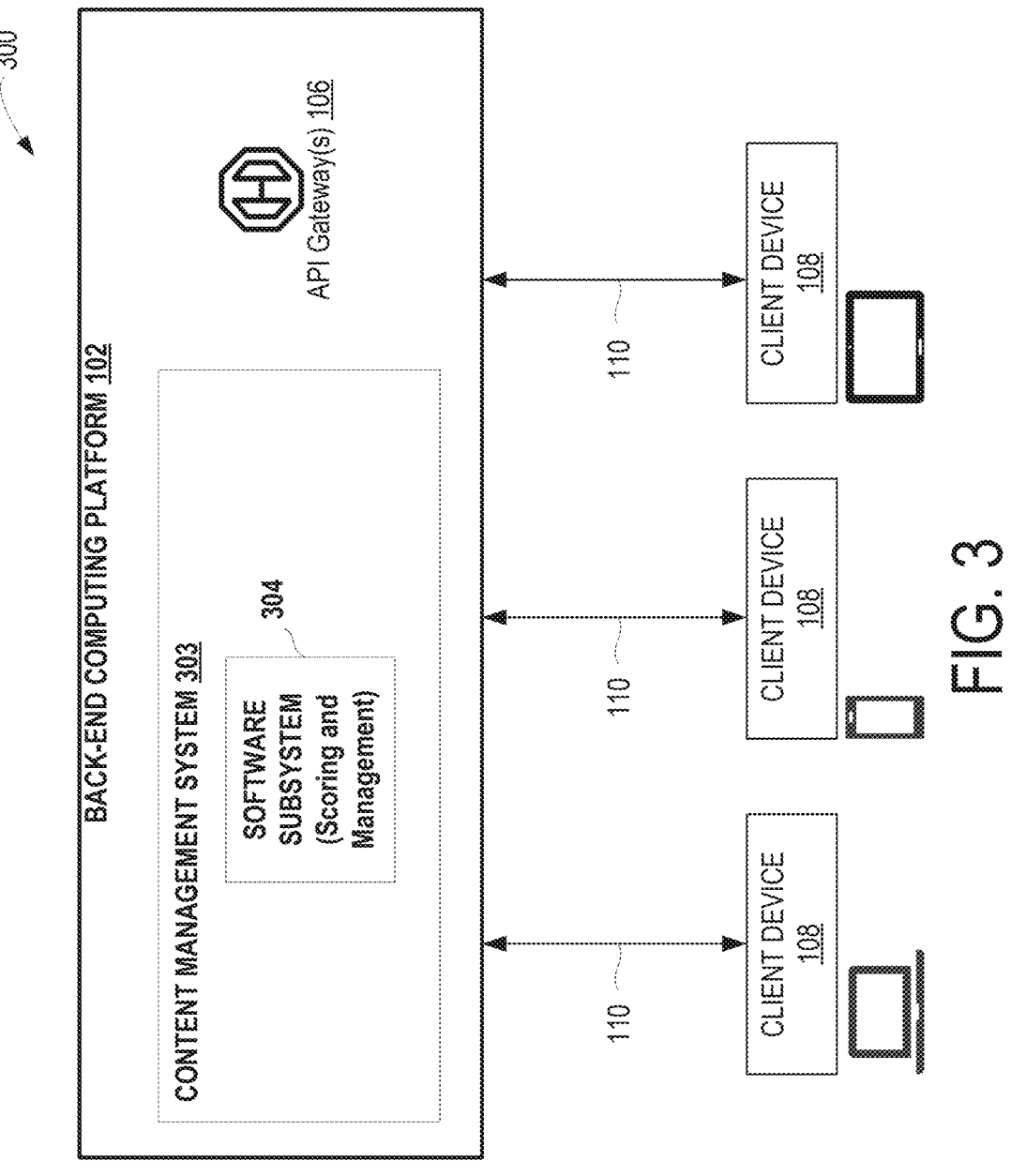
FIG. 3 depicts an example network environment including the example computing platform of FIG. 1 that has been configured to host an example scoring-and-management software subsystem, according to aspects of the disclosed technology.

One possible example of such a software subsystem is illustrated in the context of FIG. 3, which shows an updated version 300 of the network environment 100 shown in FIG. 1 in which a CMS 303 utilized by back-end computing platform 102 has been modified to include a new software subsystem 304 for scoring and managing content. In general, new software subsystem 304 is configured for (i) building and deploying one or more scoring models and (ii) managing content based on scores output by the one or more scoring models. This new software subsystem 304 may be referred to herein as a "scoring-and-management software subsystem" or "CMS scoring-and-management software subsystem."

The scoring models that may be created and deployed in accordance with the present disclosure may take various forms, but in general, (i) each such scoring model may be configured to receive data for a given set of input variables that provides information about a piece of content and then output a trustworthiness score for a piece of content based on an evaluation of data for the given set of input variables and (ii) once deployed, each such scoring model may be used to evaluate a respective piece of content hosted within the CMS by (a) obtaining data for the given set of input variables that provides information about the respective piece of content and (b) inputting the obtained data into the scoring model and thereby determine a given trustworthiness score for the respective piece of content.

The input variables that provide information about the respective piece of content can take any of various forms and may indicate any various types of information about the content-including information derivable from various sources. As one possibility, the given set of input variables may include one or more variables indicating information derived from the given piece of content itself. For instance, information derived from the given piece of content may include an age of the content, a number of sources cited by the content, and/or an indicator of the subject matter of the content, among other possibilities.

As another possibility, the given set of input variables may include one or more variables indicating information derived based on an author of the content. For instance, information derived based on an author of the content may include an indicator of author credibility and/or an indicator of author eminence, among other possibilities.

As yet another possibility, the given set of input variables may include one or more variables indicating information derived from other content (e.g., other content hosted within the CMS). For instance, information derived from other CMS content may include a number of backward citations to the content made by other pieces of content.

As still yet another possibility, the given set of input variables may include one or more variables indicating information derived from user feedback. For instance, information derived from user feedback may include an indicator of user-rated sentiment, an indicator of user-rated applicability, an indicator of user-rated credibility of author, and/or an indicator of user-rated credibility of content, among other possibilities.

As still yet another possibility, the given set of input variables may include one or more variables indicating information derived using a service that is accessible via an API. In general, APIs may expose a type of service that can be used to provide input for the scoring model. As one example, such a service may take the form of a Generative Artificial Intelligence (AI) Detection Scanner, which may be configured to analyze content and output a likelihood that the content was generated by AI rather than a human being, and an example variable may indicate such a likelihood output of the Generative AI Detection Scanner. The API extension can expose other types of services, such as AI-based analysis of content, and information obtained from the other types of services (such as AI-based analysis of content) may be used as an input for the scoring model.

It should be understood that these example input variables are merely illustrative and that the given set of input variables may include any variable that is useful for evaluating trustworthiness of a piece of content.

Further, in addition to including an identification of the given set of input variables to be evaluated, the scoring model may also include corresponding weights for such variables. At a high-level, the corresponding weights may be numeric values that may be applied to the input variables in order to balance those inputs in some manner. By virtue of these corresponding weights, different variables may have more or less influence than other variables in determining the trustworthiness score for the piece of content.

As described above, once deployed, the scoring model may be used to evaluate a given piece of content hosted within the CMS by (i) obtaining data for the given set of input variables and (ii) inputting the obtained data into the scoring model and thereby determine a given trustworthiness score for the given piece of content. At a high level, the scoring model may (i) take as input obtained values for the input variables, (ii) apply the applicable corresponding weight to each value (e.g., by multiplying the value by the applicable corresponding weight), and then (iii) aggregate the resulting, weighted values together in some manner, such as by summing the resulting, weighted values, calculating the average of the resulting, weighted values, or calculating the median of the resulting, weighted values, among other possibilities.

Figure 4:
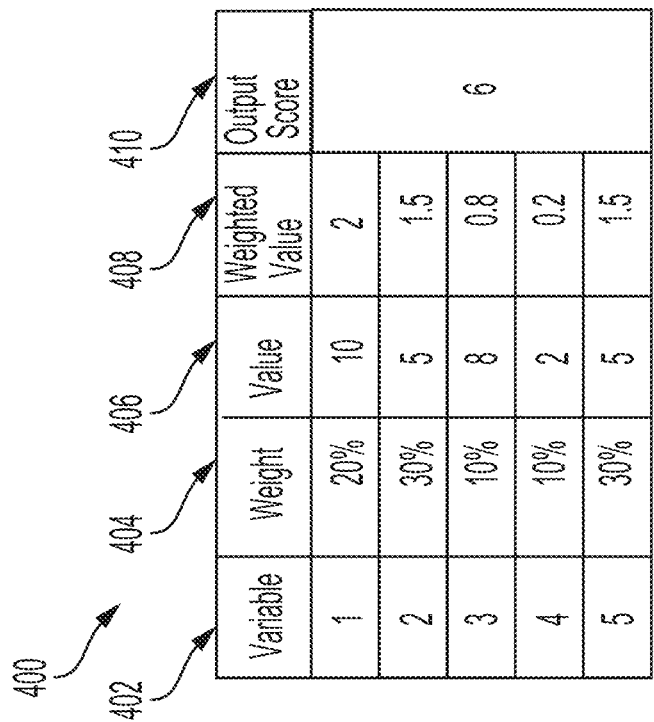
FIG. 4 depicts an example scoring model, according to aspects of the disclosed technology.

Turning now FIG. 4, one illustrative example of a scoring model is shown. In particular, FIG. 4 illustrates example scoring model 400, which includes input variables 402 and corresponding weights 404 for the input variables 402. The input variables 402 include a first variable (indicated as "Variable 1"), a second variable (indicated as "Variable 2"), a third variable (indicated as "Variable 3"), a fourth variable (indicated as "Variable 4"), and a fifth variable (indicated as "Variable 5"). Further, the corresponding weights 404 include a first weight corresponding the first variable (indicated as "20%"), a second weight corresponding the second variable (indicated as "30%"), a third weight corresponding the third variable (indicated as "10%"), a fourth weight corresponding the fourth variable (indicated as "10%"), and a fifth weight corresponding the fifth variable (indicated as "30%").

This scoring model 400 may be used to evaluate a given piece of content hosted within the CMS by (i) obtaining data for the given set of input variables and (ii) inputting the obtained data into the scoring model and thereby determine a given trustworthiness score for the given piece of content. For instance, this illustrative example shows values 406 for the respective variables for a given piece of content and an output score 410. FIG. 4 also illustrates weighted values 408 that are calculated based on the values of the input variables and corresponding weights for the input variables. In this example of FIG. 4, the applicable corresponding weight is applied to each value by multiplying the value by the applicable corresponding weight, and the resulting, weighted values are aggregated together by summing the resulting, weighted values to output the output score 410.

This example of FIG. 4 is intended as an illustrative example only in order to clearly illustrate an example of applying weights to values for the input variables, but it should be understood that in practice the scoring model and/or the evaluation of a given piece of content using the scoring model can take other forms.

In general, CMS scoring-and-management software subsystem 304 may be configured to perform functions that facilitate creation of a scoring model, examples of which may include (i) causing a client device 108 associated with a user to present a user interface for building a user-customized scoring model via a network-accessible interface, (ii) receiving, from client device 108 via the network-accessible interface, data defining a given scoring model, which may include data identifying a given set of input variables and perhaps also corresponding weights for those variables, and (iii) storing a data representation of the given scoring model.

However, it should be understood that the CMS scoring-and-management software subsystem may perform various other functions that facilitate creation of a scoring model as well. For instance, in other embodiments, the scoring models disclosed herein could be created by applying a machine learning process to a training dataset, which may include historical data for the types of input variables described herein and perhaps also corresponding ground-truth values for trustworthiness scores to be output by the scoring models, among other possibilities. In this respect, the machine learning process may involve functionality for training any of various types of models, examples of which may include a regression model, a decision-tree-based model (e.g., a gradient boosting model, random forest model, etc.), a support vector machines (SVM)-based model, a Bayesian model, a k-Nearest Neighbor (kNN) model, a Gaussian process model, a deep learning model (e.g., a feedforward, recurrent, or convolution neural-network model, a generative adversarial network (GAN) model, an autoencoder-based model, a transformer-based model, etc.), a clustering model, an association-rule model, a dimensionality-reduction model, and/or a reinforcement-learning model, among other possible examples of models that can be created using machine learning techniques.

Further, in general, the CMS scoring-and-management software subsystem may be configured to perform functions that facilitate deployment and execution of a scoring model, examples of which may include (i) putting a previously-created scoring model into a production environment so that it can be executed and (ii) for a given piece of content, using the previously-created scoring model to evaluate a given piece of content hosted within the CMS by (a) obtaining data for the given set of input variables that provides information about the given piece of content, and (b) inputting the obtained data into the scoring model and thereby determining a given trustworthiness score for the given piece of content. However, it should be understood that the CMS scoring-and-management software subsystem may perform various other functions that facilitate deployment and execution of a scoring model as well.

In turn, after CMS scoring-and-management software subsystem 304 determines the given trustworthiness score for the given piece of content, the CMS scoring-and-management software subsystem may manage the given piece of content based on the determined given trustworthiness score for the given piece of content. In general, managing the content may take the form of taking one or more actions with respect to the piece of content, examples of which are described in greater detail below.

Although in the example of FIG. 3, the scoring functionality and management functionality is disclosed as being performed by a single software subsystem (i.e., CMS scoring-and-management software subsystem 304), in other examples, the scoring functionality and management functionality may be performed by different software subsystems. For instance, the scoring functionality may be performed by a first software subsystem of CMS 303, and the managing functionality may be performed by another software system of CMS 303, which may be extended to perform such functionality. Other implementations are possible as well.

Figure 5:
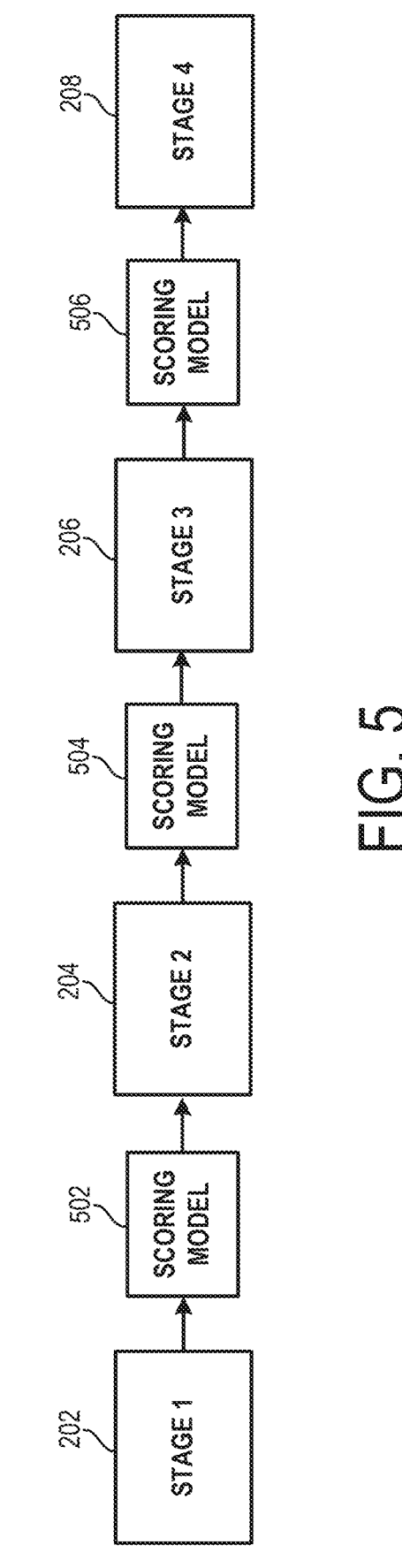
FIG. 5 depicts a conceptual illustration of how a given piece of content may flow through a CMS, according to aspects of the disclosed technology.

Scoring models may be used to evaluate a piece of content at any suitable stage within a content lifecycle of the piece of content. One possible example of how scoring models may be used to evaluate content throughout different stages of a content lifecycle is illustrated in the context of FIG. 5, which shows an updated version 500 of content lifecycle 200 shown in FIG. 2. In this updated version 500 of content lifecycle 200, respective scoring models are used to evaluate content after first stage 202, second stage 204, and third stage 206. More particularly, scoring model 502 is used to evaluate content after first stage 202, scoring model 504 is used to evaluate content after second stage 204, and scoring model 506 is used to evaluate content after third stage 206. These scoring models 502-506 may be used to determine a respective trustworthiness score for the given piece of content after each of these stages, and the given piece of content may in turn be managed based on the determined trustworthiness scores.

For instance, continuing the representative example where (i) first stage 202 is an ideation stage, (ii) second stage is a creation stage, (iii) third stage 206 is a publication stage, and (iv) fourth stage 208 is an archiving stage, scoring model 502 may be used by the CMS to evaluate a given piece of content hosted within the CMS after first stage 202, which may involve (i) obtaining data for the given set of input variables associated with scoring model 502 and (ii) inputting the obtained data into scoring model 502 and thereby determining a first trustworthiness score for the given piece of content. The CMS may then manage the piece of content based on the first trustworthiness score for the given piece of content. In an example, managing this content that is at the ideation stage may involve, for instance, approving the content for advancing to a creation stage, sending the content to an individual for review, rejecting the content to prevent the content from advancing to a creation stage, or initiating a workflow to update the content, among other possibilities. Each possible management action may be associated with a given trustworthiness score threshold or given trustworthiness score range. For instance, as an illustrative example, if content has a first trustworthiness score that meets a defined threshold after the first stage 202, then the content may be approved for advancing to second stage 204.

Further, after second stage 204, scoring model 504 may be used by the CMS to evaluate the given piece of content by (i) obtaining data for the given set of input variables associated with scoring model 504 and (ii) inputting the obtained data into scoring model 504 and thereby determining a second trustworthiness score for the given piece of content. The CMS may then manage the piece of content based on the second trustworthiness score for the given piece of content. In an example, managing this content that is at this creation stage (e.g., created but not yet published within the CMS) may involve, for instance, approving the content for advancing to a publication stage, sending the content to an individual for review for publication consideration, rejecting the content to prevent the content from advancing to a publication stage, initiating a workflow to update the content, or initiating a workflow to determine a publication location for the content (e.g., a website), among other possibilities. Each possible management action may be associated with a given trustworthiness score threshold or given trustworthiness score range. For instance, as an illustrative example, if content has a second trustworthiness score that meets a defined threshold after the second stage 204, then the content may be approved for advancing to third stage 206.

Still further, after third stage 206, scoring model 506 may be used by the CMS to evaluate the given piece of content by (i) obtaining data for the given set of input variables associated with scoring model 506 and (ii) inputting the obtained data into scoring model 506 and thereby determining a third trustworthiness score for the given piece of content. The CMS may then manage the piece of content based on the third trustworthiness score for the given piece of content. In an example, managing this content after the publication stage may involve, for instance, publishing the content at a different publication location, maintaining the publication location of the content, initiating a workflow to update the content, initiating a workflow to determine a new publication location for the content, updating the content, or archiving the content, among other possibilities. Each possible management action may be associated with a given trustworthiness score threshold or given trustworthiness score range. For instance, as an illustrative example, if content has a third trustworthiness score that is below a defined threshold associated with maintaining the published state, then the content may be selected to advance to fourth stage 208 (i.e., an archive stage).

In this representative example where (i) first stage 202 is an ideation stage, (ii) second stage is a creation stage, (iii) third stage 206 is a publication stage, and (iv) fourth stage 208 is an archiving stage, scoring models 502, 504, and 506 may be the same scoring model or different scoring models (e.g., scoring models having different sets of input variables and/or different weights). For instance, in an example, scoring model 504 and scoring model 506 may be the same scoring model (e.g., a scoring model having the same set of input variables and corresponding weights) and scoring model 502 may be a different scoring model (e.g., a scoring model having a different set of input variables and/or different weights). Other examples are possible as well.

As mentioned above with respect to FIG. 2, in some examples, the stages for a piece of content may be stages of a stage-gate process implemented by the organization for a piece of content. Scoring models 502, 504, and 506 may each be deployed at respective stages of the stage-gate process implemented by the organization.

The creation and deployment of a scoring model and management of content based on output of the scoring model is now described in greater detail with respect to FIG. 6, which depicts a flow diagram of example functionality 600 that may be carried out by a back-end computing platform hosting a CMS. For purposes of illustration only, example functionality 600 is described with reference to one given scoring model, but it should be understood that the disclosed technology allows for the creation and deployment of multiple scoring models. Further, for purposes of illustration only, example functionality 600 is described as being carried out by back-end computing platform 102 of FIG. 3, which is hosting CMS 303 that includes CMS scoring-and-management software subsystem 304, but it should be understood that example functionality 600 may be carried out by computing platforms that take other forms as well. Further, it should be understood that, in practice, the functions described with reference to FIG. 6 may be encoded in the form of program instructions that are executable by one or more processors of back-end computing platform 102. Further yet, it should be understood that the disclosed process is merely described in this manner for the sake of clarity and explanation and that the example embodiment may be implemented in various other manners, including the possibility that functions may be added, removed, rearranged into different orders, combined into fewer blocks, and/or separated into additional blocks depending upon the particular embodiment.

Figure 7:
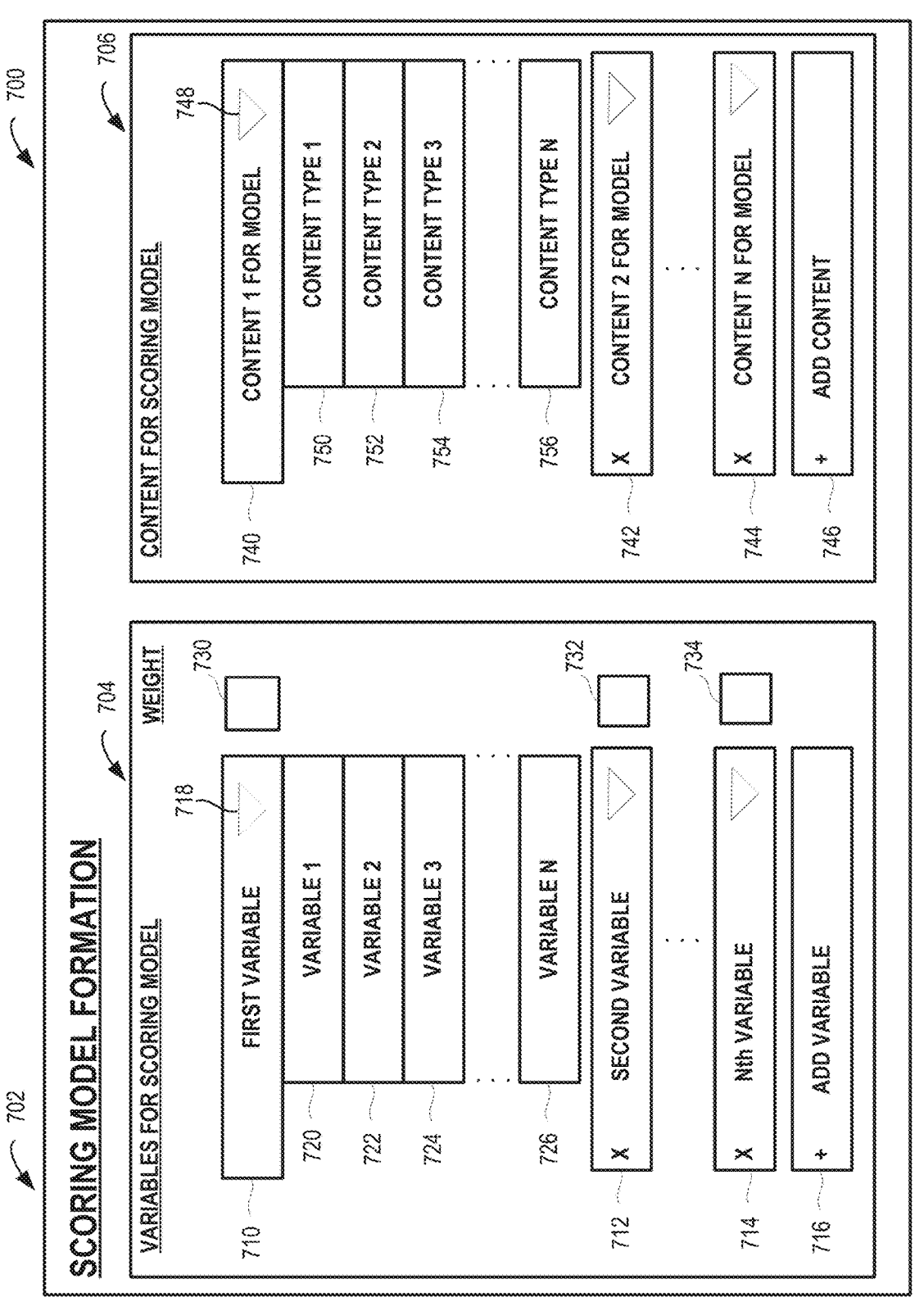
FIG. 7 depicts an example snapshot of a graphical user interface (GUI) that may be presented to a user, according to aspects of the disclosed technology.

As shown in FIG. 6, example functionality 600 may begin at block 602 with back-end computing platform 102 causing a client device to present a user interface for creating a scoring model for content hosted within CMS 303. In general, the user interface may serve to guide the user through a process of building a new scoring model, which may involve identifying a given set of input variables for the scoring model and inputting weights for the input variables, among other possibilities. Additionally, in some implementations, the user interface may enable the user to specify how the scoring model is to be used by CMS 303 (e.g., what content is to be evaluated using the scoring mode). Any suitable user interface for building a new scoring model may be presented to a user, one example of which is depicted in FIG. 7 as GUI 702 (which is described in greater detail below). However, other example user interfaces are possible as well.

Next, at block 604, back-end computing platform 102 receives, from the client device, data defining a given scoring model that is configured to output a trustworthiness score for content based on an evaluation of data for a given set of input variables that provides information about the content. In accordance with the present disclosure, the data defining given scoring model may include an identification of the given set of input variables to be evaluated along with corresponding weights for such variables, among other possibilities.

As discussed above, the input variables included in the given set of input variables can take any of various forms and may indicate any various types of information about the content-including information derivable from various sources. As one possibility, the given set of input variables may include one or more variables indicating information derived from the given piece of content itself. For instance, information derived from the given piece of content may include an age of the content, a number of sources cited by the content, and/or an indicator of the subject matter of the content, among other possibilities.

As another possibility, the given set of input variables may include one or more variables indicating information derived based on an author of the content. For instance, information derived based on an author of the content may include an indicator of author credibility and/or an indicator of author eminence, among other possibilities.

As yet another possibility, the given set of input variables may include one or more variables indicating information derived from other content (e.g., other content hosted within the CMS). For instance, information derived from other CMS content may include a number of backward citations to the content made by other pieces of content.

As still yet another possibility, the given set of input variables may include one or more variables indicating information derived from user feedback. For instance, information derived from user feedback may include an indicator of user-rated sentiment, an indicator of user-rated applicability, an indicator of user-rated credibility of author, and/or an indicator of user-rated credibility of content, among other possibilities.

As still yet another possibility, the given set of input variables may include one or more variables indicating information derived using a service that is accessible via an API. In general, APIs may expose a type of service that can be used to provide input for the scoring model. As one example, such a service may take the form of a Generative Artificial Intelligence (AI) Detection Scanner, which may be configured to analyze content and output a likelihood that the content was generated by AI rather than a human being, and an example variable may indicate such a likelihood output of the Generative AI Detection Scanner. The API extension can expose other types of services, such as AI-based analysis of content, and information obtained from the other types of services (such as AI-based analysis of content) may be used an input for the scoring model.

It should be understood that these example input variables are merely illustrative and that the given set of input variables may include any variable that is useful for evaluating trustworthiness of a piece of content.

Further, as mentioned above, the received data defining the scoring model may also include corresponding weights for the given set of input variables. In an example, the weights could be entered by the user. For instance, the user may input a first weight for a first variable, a second weight for a second variable, and so forth. In another example, back-end computing platform 102 may automatically assign the corresponding weights. In another example, back-end computing platform 102 may be configured to assign equal weights to each input variable by default, but the weights may be updated by the user to provide user-customized weights for the input variable. Other examples are possible as well.

When defining the input variables and corresponding weights for the scoring model, the user may take various factors into account, such as the category of content (which may also be referred to herein as "type of content") for which the scoring model is to be used, the lifecycle stage of the content for which the scoring model is to be used, and/or preferences of the content manager and/or organization associated with the CMS. In this regard, scoring models for different categories of content may comprise different sets of input variables and/or different weights. For instance, the different sets of content could be different categories of content. As a first illustrative example, a first scoring model for a first type of content (e.g., a blog post) may rate trustworthiness based on a set of five variables including (i) user-rated sentiment, (ii) user-rated applicability, (iii) content age, (iv) author credibility, and (v) output of the Generative AI Detection Scanner. As a second illustrative example, a second scoring model for a second type of content (e.g., an article), a scoring model may rate trustworthiness based on a set of seven variables including (i) age of the content, (ii) number of sources cited by the content, (iii) citations of the content made in other pieces of content, (iv) author credibility, (v) author eminence, (vi) user-rated sentiment, and (vi) user-rated applicability. Other examples are possible as well.

Furthermore, as mentioned above, different scoring models may be utilized for the same category of content at different stages of the lifecycle of that content. For instance, the different sets of content could be content at different stages of a lifecycle of the content (e.g., ideation stage of an article v. publishing of an article). In practice, scoring models for different stages may comprise different sets of input variables and/or different weights. For instance, continuing the second illustrative example, this second scoring model may be a scoring model for the second type of content (e.g., an article) at a first stage of the lifecycle of the content (e.g., publication). As another illustrative example, a third scoring model for the second type of content (e.g., an article) at a second stage of the lifecycle of the content (e.g., ideation) may rate trustworthiness based on a set of variables including (i) author credibility, (ii) author eminence, (iii) user-rated sentiment, and (iv) user-rated applicability. Other examples are possible as well.

The input variables and/or corresponding weights may vary from model to model based on other factors as well.

Back-end computing platform 102 may receive data defining the set of variables and the weights of the variables in various ways. As indicated above, a user interface for building a new scoring model may be presented to a user, and back-end computing platform 102 may receive data entered by a user using the user interface for building a new scoring model.

In order to facilitate the user's task of identifying the one or more input variables of the scoring model, the user interface may include a view that (i) presents a list of one or more available variables and (ii) enables the user to select one or more of the variables to use as input variables the scoring model. In practice, the list of available variables may be presented to the user for selection in various ways. As one example, the list of available variables may be presented to the user in the form of a drop-down list from which one or more of the available content types may be selected. As another example, the list of available variables may be presented to the user in the form of a list of selectable tiles corresponding to the variables that can each be dragged and dropped into a selection panel. The list of available variables may be presented to the user for selection in other manners as well. Further, in some examples, the list of one or more available variables may depend on various factors such as preferences of the organization associated with the CMS, among other possibilities.

Further, in order to facilitate the user's task of identifying the corresponding weights, the user interface may include GUI elements that enable a user to enter and/or adjust the corresponding weights.

Further yet, in some examples, in order to facilitate the user's task of selecting a content type or content types for which the scoring model is to be used, the user interface may include a view that (i) presents a list of one or more available content types and (ii) enables the user to select one or more of the content types for which to use the scoring model. In practice, the list of available content types may be presented to the user for selection in various ways. As one example, the list of available content types may be presented to the user in the form of a drop-down list from which one or more of the available content types may be selected. As another example, the list of available content types may be presented to the user in the form of a list of selectable tiles corresponding to the content types that can each be dragged and dropped into a selection panel. The list of available content types may be presented to the user for selection in other manners as well. Further, in some examples, the list of one or more available content types may depend on various factors such as preferences of the organization associated with the CMS, among other possibilities.

Still further, in some examples, in order to facilitate the user's task of selecting a content-lifecycle stage for which the scoring model is to be used, the user interface may include a view that (i) presents a list of one or more available content-lifecycle stages and (ii) enables the user to select one or more of the content-lifecycle stages for which to use the scoring model. In practice, the list of available content-lifecycle stages may be presented to the user for selection in various ways. As one example, the list of available content-lifecycle stages may be presented to the user in the form of a drop-down list from which one or more of the available content-lifecycle stages may be selected. As another example, the list of available content-lifecycle stages may be presented to the user in the form of a list of selectable tiles corresponding to the content types that can each be dragged and dropped into a selection panel. The list of available content-lifecycle stages may be presented to the user for selection in other manners as well. Further, in some examples, the list of one or more available content-lifecycle stages may depend on various factors such as preferences of the organization associated with the CMS, among other possibilities.

In line with the discussion above, in other embodiments, the given scoring model could be created by applying a machine learning process to a training dataset, among other possible ways that the given scoring model could be created.

Returning to FIG. 6, at block 606, back-end computing platform 102 may use the given scoring model to evaluate content within the CMS and thereby determine trustworthiness scores for such content. In line with the discussion above, the content that is evaluated using the given scoring model could comprise all of the content within the CMS or a subset of the content within the CMS-such as a certain category of content and/or content at a certain lifecycle stage, among other possibilities. For purposes of explanation only, the functionality for evaluating and managing content based on the given scoring model with be described with reference to one given piece of content, but it should be understood that similar functionality will be carried out with respect to other pieces of content as well.

In one implementation, the back-end computing platform's functionality of using the given scoring model to evaluate a given piece of content within the CMS may involve back-end computing platform 102 (i) obtaining data for the given set of input variables and (ii) inputting the obtained data into the scoring model and thereby determining a given trustworthiness score for the given piece of content.

Back-end computing platform 102 may obtain the data for the given set of input variables in various ways. At a high-level, this function may involve, for each respective variable of the set of input variables, either (i) obtaining a preexisting data value for the respective variable (i.e., a value that already exists in a form that can be used as an input to a scoring model) or (ii) deriving a data value for the respective variable based on other preexisting data that is obtained. Notably, the ways back-end computing platform 102 obtains data related to a given variable may depend on the given variable.

For example, as one possibility, regarding variables indicating information derived from the given piece of content itself, back-end computing platform 102 may be configured to derive data values for the variables based on an analysis of the content and/or metadata of the content. For instance, based on an analysis of the content and/or metadata of the content, back-end computing platform 102 may derive data values for variables such as age of the content, number of sources cited by the content, or subject matter of the content from the content. Back-end computing platform 102 may then use the derived data values for the variables indicating information derived from the given piece of content itself.

As another possibility, regarding variables indicating information derived based on an author of the content, back-end computing platform 102 may be configured to maintain one or more preexisting data values related to the author. For instance, back-end computing platform 102 may maintain a preexisting data value for author credibility of the author and/or a preexisting data value for author eminence of the author. Further, back-end computing platform 102 may be configured to (i) obtain such preexisting data values during an execution phase of the scoring-and-management software subsystem 304 and (ii) use the preexisting data values for the variables indicating information derived based on an author of the content.

As yet another possibility, regarding variables indicating information derived from other CMS content, back-end computing platform 102 may be configured to derive data values for the variables based on an analysis of other CMS content and/or metadata of other CMS content. For instance, based on an analysis of other CMS content and/or metadata of other CMS content, back-end computing platform 102 may derive data value for a variable such as a number of backward citations to the content made by other pieces of content. Back-end computing platform 102 may then use the derived data value for the variable indicating information derived from other CMS content.

As yet another possibility, regarding variables indicating information derived from user feedback, back-end computing platform 102 may (i) obtain user feedback data related to the variables and (ii) derive data values for the variables based on the obtained user feedback data. Back-end computing platform 102 may be configured to obtain data related to user feedback in various ways. For instance, back-end computing platform 102 may be configured to, when presenting content to a reader, present a user interface for providing feedback to the content. In this regard, the user interface may present an element (e.g., an element having a selectable YES icon and a selectable NO icon) for entering user feedback as to whether the content is applicable, an element for entering user feedback as to whether the user likes or dislikes the content, element for entering user feedback as to whether the author is credible, and so forth. As another example, the user interface may allow the user to enter comments, which back-end computing platform 102 may in turn be configured to process (e.g., determine a number of positive comments versus number of negative comments). As another example, along the presentation of the piece of content, back-end computing platform 102 may display an indication of a survey and an associated link which as user may click on to be redirected to a survey form via which a user may provide feedback related to one or more user-feedback variables for the scoring model associated with the piece of content. Other forms of obtaining data related to user feedback for a piece of content are possible as well.

After collecting user feedback data related to the variables indicating information derived from user feedback for a given piece of content, back-end computing platform 102 may derive data values for the variables by aggregating the user feedback data. In this regard, back-end computing platform 102 may be configured to aggregate the user feedback data to derive data values for the variables in various ways. For instance, back-end computing platform 102 may be configured to, for a given variable, determine a sum of the user feedback data related to the given variable, an average of the user feedback data related to the given variable, or a mean of the user feedback data related to the given variable, among other possibilities. Notably, by collecting user feedback in this manner, back-end computing platform 102 is able to crowdsource user feedback, which may help to provide a reliable indication of reactions of the readership to the content of the CMS, which in turn may help to provide a more reliable indication of trustworthiness of the content hosted within the CMS.

As yet another possibility, regarding variables indicating information derived using an API, back-end computing platform 102 may be configured to obtain data values from the API and use the received data values for the respective variables. For example, an example variable may be a variable corresponding to an output of the Generative AI Detection Scanner, and back-end computing platform 102 may be configured to receive the output and use that received output as the obtained data for the respective variable. In other examples, back-end computing platform 102 may receive data from the API and then derive a data value for the respective variable based on the received data.

Other examples of obtaining data for the given set of input variables are possible as well.

After obtaining the data for the given set of input variables, back-end computing platform 102 (and more particularly, CMS scoring-and-management software subsystem 304) may input the obtained data (e.g., the determined value for each variable) into the scoring model and thereby determine a given trustworthiness score for the given piece of content. This may involve inputting the determined value for each input variable, applying the corresponding weights, and determining the trustworthiness score based on the values and corresponding weights.

The scores output by the given scoring model may take any suitable form. In an example, the scores may be numeric scores, such as a score within a given range (e.g., 1-10, 1-100, etc.). In another example, the scores may be represented with textual indicators (e.g., "Extremely Trustworthy," "Very Trustworthy," "Medium Trustworthy," "Low Trustworthy," "Not Trustworthy," and so forth). However, other forms for the scores output by the given scoring model are possible as well.

While the back-end computing platform's functionality of using the given scoring model to evaluate a given piece of content within the CMS is described above in terms of an implementation where the given scoring model is deployed at and executed by a software subsystem of back-end computing platform 102, as noted above, there may be other implementations where the given scoring model is deployed at and executed by a system that is external to back-end computing platform 102. And in these alternate implementations, the back-end computing platform's functionality of using the given scoring model to evaluate a given piece of content within the CMS may involve back-end computing platform 102 (i) obtaining data for the given set of input variables, (ii) sending the data to an external scoring engine which in turn may determining a given trustworthiness score for the given piece of content, and (iii) receiving the determined given trustworthiness score for the given piece of content from the external scoring engine.

The back-end computing platform's functionality of using the given scoring model to evaluate a given piece of content hosted within the CMS may take other forms as well.

Returning to FIG. 6, at block 608, back-end computing platform 102 manages the given piece of content based on the given trustworthiness score for the given piece of content (either alone or together with other information about the given piece of content). This functionality of managing the given piece of content may involve any of various types of management actions.

As one possibility, the functionality of managing the given piece of content based on the given trustworthiness score for the given piece of content may involve managing the state of the given piece of content based on the given trustworthiness score, which may take any of various forms.

For instance, managing the state of the given piece of content based on the given trustworthiness score may involve determining whether to change the lifecycle stage for the given piece of content based on the given trustworthiness score (either alone or together with other information about the given piece of content). In this respect, as discussed with respect to FIG. 2, there may be various lifecycle stages of content, examples of which may include ideation, planning, creation, certification, publication, and archiving, among other possibilities, and back-end computing platform 102 may use the given trustworthiness score (either alone or together with other information about the given piece of content) as a basis for determining whether to advance the given piece of content from a current lifecycle stage to a different lifecycle stage. For example, back-end computing platform 102 may use the given trustworthiness score as a basis for determining whether to advance the given piece of content from an ideation stage to a creation stage, advance the given piece of content from a creation stage to a publication stage, or advance the given piece of content from a publication stage to an archive stage. As another example, back-end computing platform 102 may use the given trustworthiness score as a basis for determining whether to change the given piece of content from an archive stage back to a publication stage. Other examples are possible as well.

After making the determination of whether to change the lifecycle stage of the given piece of content, back-end computing platform 102 may in turn take one or more actions in accordance with that determination. For instance, in a scenario where back-end computing platform 102 makes a determination to change the lifecycle stage of the given piece of content, back-end computing platform 102 may carry out one or more actions in order to effect that change to the lifecycle stage of the given piece of content, which may take any of various forms depending on the type of lifecycle change being made for the given piece of digital content. In this way, back-end computing platform 102 may provide self-regulated management of content within the CMS.

For example, if back-end computing platform 102 has determined to change the lifecycle stage of the given piece of content from an ideation stage to a creation stage, back-end computing platform 102 may in turn carry out actions for effecting creation of the given piece of content, such as by allowing the author of the given piece of content to access certain tools and/or workflows related to the creation stage that may not have previously been made available to the author and/or sharing the given piece of content with other users that have involvement or oversight of the creation stage, among other possible actions that may be carried out when the lifecycle stage of the given piece of content changes to the creation stage.

As another example, if back-end computing platform 102 has determined to change the lifecycle stage of the given piece of content from a creation stage to a publication stage, back-end computing platform 102 may in turn carry out actions for effecting the publication of the given piece of content, such as by making the given piece of content available a location within the organization's internet or intranet domain so that it can be accessed and viewed by readers, among other possible actions that may be carried out when the lifecycle stage of the given piece of content changes to the publication stage. As part of this functionality, back-end computing platform 102 may also determine a location where the given piece of content is to be published within the organization's internet or intranet domain, and in some implementations, this determination could also be based at least in part on the given trustworthiness score. For instance, content having higher trustworthiness scores could be published to a location that is accessible to (or is otherwise expected to be visited by) a larger group of individuals, whereas content having lower trustworthiness scores could be published to a location that is accessible to (or is otherwise expected to be visited by) a smaller group of individuals, among various other examples.

As yet another example, if back-end computing platform 102 has determined to change the lifecycle stage of the given piece of content from a publication stage to an archive stage, back-end computing platform 102 may in turn carry out actions for effecting the archiving of the given piece of content, such as by hiding the given piece of content from readers while continuing to store the given piece of content within the CMS in a way that allows it to be accessed by certain types of users (e.g., content managers, administrators, etc.), among other possible actions that may be carried out when the lifecycle stage of the given piece of content changes to the archive stage.

In some implementations, the actions for effecting a change to the lifecycle stage of the given piece of content may also involve initiating an "approval" workflow that is to be carried out by a certain type of user of the CMS (e.g., a content manager) in order to approve the lifecycle stage change. For example, after making a determination to change the lifecycle stage of the given piece of content from a creation stage to a publication stage, back-end computing platform 102 may cause a client device associated with a given user of the CMS to present the given user with a user interface for an approval workflow that must be completed before the given piece of content can be published. Other examples of scenarios where approval workflows may be used are possible as well.

The actions that may be carried out by back-end computing platform 102 in order to effect a change to the lifecycle stage of the given piece of content may take various other forms as well.

On the other hand, if back-end computing platform 102 makes a determination not to change the lifecycle stage of the given piece of content based on the given trustworthiness score, then back-end computing platform 102 either may forgo taking any other action with respect to the given piece of content or may take one or more other actions in accordance with the determination not to change the lifecycle stage of the given piece of content, such as by prompting the author to edit the given piece of content in order to improve its trustworthiness score (perhaps along with providing suggestions as to how to improve trustworthiness score).

The function of managing the state of the given piece of content based on the given trustworthiness score could take other forms as well. For instance, after a given piece of content has entered the publication stage and been published within the organization's internet or intranet domain, back-end computing platform 102 may change the location where the given piece of content is published within the organization's internet or intranet domain based on given trustworthiness score. To illustrate with an example, back-end computing platform 102 could determine to either "promote" the given piece of content to a more prominent location within the organization's internet or intranet domain (e.g., a homepage of the organization's internet or intranet site) if it has a higher trustworthiness score or "demote" the given piece of content to a less prominent location within the organization's internet or intranet domain (e.g., a given webpage of the organization's internet or intranet site that is for a given business unit) if it has a lower trustworthiness score, among other possible examples.

As another possibility, the functionality of managing the given piece of content based on the given trustworthiness score for the given piece of content may involve managing how the given piece of content is presented to readers based on the given trustworthiness score for the given piece of content (e.g., the "look and feel" of the presentation of the given piece of content). For instance, back-end computing platform 102 may be configured to use the given trustworthiness score as a basis for determining the style, color, and/or size of the font used to present the given piece of content to readers and/or the page layout used to present the given piece of content to readers, among other possible examples.

As yet another possibility, the functionality of managing the given piece of content based on the given trustworthiness score for the given piece of content may involve prompting users of the CMS to perform some other task with respect to the given piece of content based on the given trustworthiness score (e.g., tasks that are unrelated to lifecycle management).

As noted above, back-end computing platform 102 may perform one or more of the foregoing management actions based on the given trustworthiness score for the given piece of content-either alone or together with other information about the given piece of content. In this respect, at a minimum, back-end computing platform 102 may be configured to evaluate and determine whether at least one condition related to trustworthiness score (e.g., whether the given trustworthiness score exceeds a threshold score) has been met, and then use that determination as a basis for performing one or more of the foregoing management actions. Additionally, in some scenarios, back-end computing platform 102 may be configured to evaluate and determine whether one or more other conditions related to other information about the given piece of content are met, and may then use that determination as an additional basis for performing one or more of the foregoing management actions. To illustrate with a few representative examples, back-end computing platform 102 may be configured to determine whether to advance a given piece of content to a publication stage based on a single condition related to related to trustworthiness score, such as whether the given trustworthiness score exceeds a threshold score, whereas back-end computing platform 102 may be configured to determine whether to advance a given piece of content to an archive stage based on multiple conditions, such as (i) whether the given trustworthiness score falls below a threshold score and (ii) whether the age of the given piece of content exceeds a threshold age. Many other examples are possible as well.

The functionality of managing the given piece of content based on the given trustworthiness score for the given piece of content may take other forms as well.

In some implementations, in order to facilitate the function of managing the given piece of digital content, back-end computing platform 102 may also be configured to define and operate in accordance with a set of content-management rules for managing digital content based on trustworthiness scores output by the given scoring model, each of which may comprise (i) a set of one or more management actions to be performed on a piece of content and (ii) a respective condition related to trustworthiness score (and perhaps one or more other conditions related to other information about the piece of content) that, if met, triggers back-end computing platform 102 to carry out the set of one or more management actions. In this respect, after using the given scoring model to evaluate the given piece of content and thereby determine the given trustworthiness score for the given piece of content, back-end computing platform 102 evaluate the set of content-management rules to determine which of the rules (if any) are satisfied and thus which of the management actions (if any) are to be performed.

These content-management rules may help to automate management actions related to content hosted within a CMS, thereby allowing content to be automatically managed based on a trustworthiness scores output by the given scoring model. Such content-management rules may be created in any of various manners.

For instance, as one possibility, the content-management rules may be customized by a user, in which case back-end computing platform 102 (or an external system) may be configured to cause a client device to present a user interface that includes one or more user-interface elements for defining content-management rules for managing digital content based on the trustworthiness scores output by the given scoring model.

In order to facilitate the user's task of creating at least one content-management rule, the user interface may include a view that (i) presents a list of available actions that may be carried out by back-end computing platform 102 with respect to CMS-based digital content and (ii) enables the user to select one or more of the actions to add to a content-management rule. In this respect, the set of available actions may be defined by the provider of the CMS or a user of the CMS (e.g., a content manager or administrator), among other possibilities.

In practice, the list of available actions may be presented to the user for selection in various ways. As one example, the list of available actions may be presented to the user in the form of a drop-down list from which one or more of the available actions may be selected. As another example, the list of available actions may be presented to the user in the form of a list of selectable tiles corresponding to the actions that can each be dragged and dropped into a selection panel. The list of available actions may be presented to the user for selection in other manners as well.

The user interface may also include a view that enables the user to define a respective condition or a set of multiple conditions that, if met, triggers back-end computing platform 102 to carry out the selected set of one or more actions. For instance, at a minimum, the presented view may enable the user to define a condition related to trustworthiness score, such as a maximum or minimum trustworthiness score threshold or a given trustworthiness score range. Additionally, the presented view may also enable the user to define one or more conditions related to other information about the content, such as a maximum or minimum age threshold. Other examples of conditions for content-management rules that be defined by the user possible as well.

The functionality for enabling a user to create content-management rules for managing digital content based on the trustworthiness scores output by the given scoring model may take other forms as well. Further, in other embodiments, the content-management rules could be hardcoded into the CMS and/or could be created through the use of a machine learning process carried out by back-end computing platform 102, among other possible ways that the content-management rules could be created.

It should also be understood that certain content-management rules could be defined for use with a single scoring model, such as the given scoring model described above, whereas other content-management rules could be defined for use with multiple different scoring models (e.g., a "global" content-management rule), among other possibilities.

After the set of content-management rules for managing digital content based on trustworthiness scores output by the given scoring model are defined, back-end computing platform 102 may then deploy and begin operating in accordance with the set of content-management rules, which as noted above may involve evaluating the set of content-management rules to determine which of the rules (if any) are satisfied and thus which of the management actions (if any) are to be performed.

In some implementations, after making an initial determination of a trustworthiness score for a given piece of digital content and potentially taking some management action with respect to the given piece of digital content, back-end computing platform 102 may also be configured to re-evaluate the trustworthiness score for the given piece of digital content at one or more other times in the future, and based on the trustworthiness score, back-end computing platform 102 may then further manage the given piece of digital content. For instance, back-end computing platform 102 may be configured to (i) use the given scoring model to re-evaluate the given piece of content hosted within the CMS and thereby determine an updated given trustworthiness score for the given piece of content, (ii) based on the updated given trustworthiness score for the given piece of content, identify one or more management actions that are to be carried out with respect to the given piece of digital content, and (iii) carry out the identified one or more management actions with respect to the given piece of digital content. In this regard, back-end computing platform 102 may be configured to re-evaluate (and potentially update) the trustworthiness score for the given piece of digital content either periodically (e.g., every hour, day, week, etc.) or in response to certain triggering events (e.g., state changes, user requests, etc.), among other possibilities.

This functionality of re-evaluating the trustworthiness score for a given piece of digital content at one or more times in the future is particularly useful in scenarios where the values of at least some of the input variables of the given scoring model are expected to change over time. For instance, as one possibility, age of an article or user feedback may change over time. This change in the data for some variables of scoring model may in turn alter the trustworthiness score for the content. For example, with reference to age of piece of content, as the age of a piece of content becomes higher, the trustworthiness of the content may be reduced by virtue of the content becoming more outdated. In such an example, increasing age may contribute to a decreasing trustworthiness score for the piece of content. As another possibility, with reference to user feedback, as a piece of published content receives user feedback, the trustworthiness score may change over time due to the user feedback. For instance, in a scenario where a published article receives a large amount of positive feedback, the trustworthiness score for the content may increase. As an illustrative example, the value for a variable of user-sentiment may increase as more and more users provide positive feedback for the user sentiment, which in turn may contribute to increasing the trustworthiness score. On the other hand, in a scenario where a published article receives a large amount of negative feedback, the trustworthiness score may decrease. In this respect, re-evaluating the trustworthiness score at one or more times in the future may help to reflect the true trustworthiness of the piece of content.

In addition to using trustworthiness scores output by the given scoring model as a basis for performing management actions on content within a CMS, back-end computing platform 102 may be configured to carry out other actions based on the trustworthiness scores as well.

For instance, in some implementations, back-end computing platform 102 may be configured to generate and send notifications that are based on the trustworthiness scores. Such notifications may provide notice to users of the CMS regarding the status and/or trustworthiness scores of pieces of content within the CMS, and may be useful for users for (i) determining content needs and/or desires within the organization and (ii) tailoring the content they create to those needs and/or desires within the organization. Various notifications are possible.

As one possibility, in an implementation where back-end computing platform 102 is configured to re-evaluate the trustworthiness score for a given piece of content on an ongoing basis, back-end computing platform 102 may be configured to send a notification that the trustworthiness score for the given piece of content has changed, which may include an indication of the updated trustworthiness score and perhaps also the prior trustworthiness score, among other possible information that may be included as part of the notification. In this respect, back-end computing platform 102 could be configured to send such a notification based on any change to the trustworthiness score, or alternatively, could be configured to send such a notification based on a threshold change to the trustworthiness score (e.g., a threshold increase or a threshold decrease). Further, in practice, back-end computing platform 102 could be configured to cause such a notification to be sent to and displayed by a client device associated with an author of the given piece of content and/or some other user of the CMS (e.g., a content manager).

As another possibility, back-end computing platform 102 may be configured to send a notification when a state change decision has been made based on the trustworthiness score for a given piece of content. For example, if back-end computing platform 102 uses the trustworthiness score for a given piece of content as a basis for deciding that the given piece of content can be promoted to a next stage of its lifecycle (e.g., the content is sufficiently trustworthy), back-end computing platform 102 may be configured to send a notification of that decision to approve the state change, which may include an indication of the type of state change being made (e.g., which stages are involved) and perhaps also an indication of the trustworthiness score. As another example, if back-end computing platform 102 uses the trustworthiness score for a given piece of content as a basis for deciding that the given piece of content should not be promoted to a next stage of its lifecycle (e.g., the content is not sufficiently trustworthy), back-end computing platform 102 may be configured to send a notification of that decision to reject the state change, which may include an indication of the type of state change that was rejected and perhaps also an indication of the reason(s) why the state change was rejected and/or an indication of the trustworthiness score. Other examples are possible as well. Further, in practice, back-end computing platform 102 could be configured to cause such a notification to be sent to and displayed by a client device associated with an author of the given piece of content and/or some other user of the CMS (e.g., a content manager).

Back-end computing platform 102 could be configured to send other types of notifications that are based on the trustworthiness scores as well. Further, similar to the content-management actions described above, back-end computing platform 102 may be configured to send such notifications in accordance with user-customizable notification rules. In this regard, back-end computing platform 102 may be configured to cause a client device to present a user interface that includes one or more user-interface elements for defining rules for sending notifications based on trustworthiness scores, where each such rule may include (i) a type of notification to be sent and (ii) a respective condition (or set of multiple conditions) that, if met, triggers back-end computing platform 102 to send the type of notification.

In other implementations, back-end computing platform 102 may be configured to use the trustworthiness score for a given piece of content as a basis for determining an "eminence" score for an author of the given piece of content. For instance, in order to determine an eminence score for an author, back-end computing platform 102 may (i) identify the pieces of content that were created by the author, (ii) determine the trustworthiness scores of the pieces of content in the manner described above, and then (iii) based on the determined trustworthiness scores of the pieces of content created by the author (and perhaps other information about the author and/or the pieces of content created by the author), determine an eminence score for the author. In this respect, a high trustworthiness score for any given piece of content may positively impact an eminence score, whereas a low trustworthiness score for any given piece of content may negatively impact an eminence score. After determining an eminence score for an author in this manner, back-end computing platform 102 may then function to use that eminence score for any of various purposes. For instance, as one possibility, back-end computing platform 102 may cause an indication of an author's eminence score to be sent to and displayed by a client device associated with the author and/or some other user of the CMS (e.g., a content manager). As another possibility, back-end computing platform 102 may use the eminence score for an author as an input to a scoring model that is applied to content created by that author. In this way, a trustworthiness score for a given piece of content may impact trustworthiness scores for other pieces of content created by that same author. This may help authors establish and/or improve their credibility.

In still other implementations, back-end computing platform 102 may be configured to provide trustworthiness scores output by a scoring model to an external system (e.g., a computing platform operated by another organization), which in turn may be configured to utilize the trustworthiness scores determined by back-end computing platform 102 for any of various purposes. In this respect, back-end computing platform 102 may be configured to provide trustworthiness scores to an external system by exposing them via an API that is accessible by external systems, among other possible ways that back-end computing platform 102 may provide trustworthiness scores.

To illustrate with an example, back-end computing platform 102 may provide trustworthiness scores (e.g., via an API) to an external system that implements search engine functionality. In turn, the external system may utilize the trustworthiness scores when carrying out its search engine functionality, such as by selecting a position at which content appears in a list of search results based on its trustworthiness score (e.g., a piece of content having a high trustworthiness score may be assigned prominent position in the search results, whereas a piece of content with a low trustworthiness score may be assigned a low position in the search results) and/or omitted certain content from a list of search results (e.g., content having a threshold low trustworthiness score). Other examples are possible as well.

Back-end computing platform 102 could also be configured to use the trustworthiness scores as a basis for carrying out other actions as well.

In accordance with the disclosed technology, a user (e.g., content manager) may also be provided with the capability to modify a previously-created scoring model and/or a previously-created rule that is based on a previously-created scoring model (e.g., a content management rule, a notification rule, etc.). To facilitate this functionality, back-end computing platform 102 (or an external system) may be configured to cause a client device to present a user interface that includes one or more user-interface elements for modifying a previously-created scoring model and/or a previously-created rule that is based on a previously-created scoring model, and a user of the client device may then use that user interface to modify a previously-created scoring model and/or a previously-created rule.

If a previously-created scoring model is modified, back-end computing platform 102 may then be configured to deploy the modified scoring model. In this respect, back-end computing platform 102 may begin using the modified scoring model to evaluate any new content that is created after deployment of the modified scoring model. Additionally, in some implementations, back-end computing platform 102 may be configured to use the modified scoring model to re-evaluate content that was created prior to deployment of the modified scoring model and was evaluated using the prior version of the scoring model-which may cause back-end computing platform 102 to make different stage change determinations and/or take different management actions with respect to that content than it did based on the trustworthiness scores output by the prior version of the scoring model. As an illustrative example, after using the modified version of the scoring model to re-evaluate one or more articles that were published based on trustworthiness scores output by the prior version of the scoring model, back-end computing platform 102 may decide to archive the one or more articles. Or as an illustrative example, after using the modified version of the scoring model to re-evaluate one or more articles that were archived based on trustworthiness scores output by the prior version of the scoring model, back-end computing platform 102 may decide to re-publish the one or more articles. Many other examples are possible as well.

Likewise, if a previously-created rule based on a scoring model is modified, back-end computing platform 102 may then be configured to deploy the modified rule. In this respect, back-end computing platform 102 may begin applying the modified rule to any new content that is created after deployment of the modified rule. Additionally, in some implementations, back-end computing platform 102 may be configured to apply the modified rule to content that was created prior to deployment of the modified rule and was evaluated using the prior version of the rule-which may cause back-end computing platform 102 to take different management actions with respect to that content than it did based on the prior version of the rule. As an illustrative example, after using the modified version of the rule to re-evaluate one or more articles that were published in accordance with the prior version of the rule, back-end computing platform 102 may decide to archive the one or more articles (e.g., because the modified rule has a different trustworthiness score threshold for archiving). Or as an illustrative example, after using the modified version of the rule to re-evaluate one or more articles that were archived based on the prior version of the rule, back-end computing platform 102 may decide to re-publish the one or more articles. Many other examples are possible as well.

In this way, the disclosed technology may enable a user (e.g., a content manager) of the CMS to make adjustments to how content is evaluated and managed within the CMS (e.g., adjustments to the corpus, look, and/or feel of published content) on a more global basis rather than having to go through and make such adjustments on a piece-by-piece basis, which is labor intensive, time consuming, and perhaps not even feasible depending on the volume of content within the CMS. This capability to make CMS-level adjustments to how content is evaluated and managed is beneficial, because an organization's views as to how to quantify the trustworthiness of content and/or how to manage content based on the assessed trustworthiness of that content may evolve over time based on factors such as content needs, readership trends, corporate trends, and/or executive priorities, among other possibilities, and the organization may want to retroactively change how existing content within the CMS is evaluated and managed to reflect these evolving views.

While the functionality of FIG. 6 is described above as being carried out by the back-end computing platform that is hosting the CMS, in other implementations, it is possible that certain of the foregoing functionality could be carried out by a system external to the back-end computing platform hosting the CMS. For instance, an external system could be configured to perform the functionality related to creating the given scoring model and using the given scoring model to evaluate content within the CMS, in which case the back-end computing platform hosting the CMS could be configured to make calls to interact with the external system in order to accomplish the foregoing functionality-such as by requesting that the external system determine and provide trustworthiness scores for certain content within the CMS. In this respect, the back-end computing platform hosting the CMS may be configured to (i) send a request to the external system for a trustworthiness score for a given piece of content that is identified by the back-end computing platform and (ii) receive a response from the external system that indicates the trustworthiness score for the given piece of content, which may then be used by the back-end computing platform as a basis for managing the content. Additionally, an external system could be configured to perform certain functionality related to managing content based on the given scoring model, such as by using the trustworthiness scores to determine which management actions are to be carried out with respect to content within the CMS and then sending an indication of the management actions to the back-end computing platform, which may in turn carry out the management actions. The back-end computing platform hosting the CMS may interact with external systems in other manners as well as well.

One illustrative example of a user interface for creating a scoring model will now be shown and described with respect to FIG. 7, which illustrates a snapshot of a GUI that may be presented by a given client device 108. In particular, snapshot 700 is an example snapshot of the illustrated GUI 702 that may be presented to a user as a scoring model is being formed. GUI includes a window 704 for selecting variables (and associated weights) for a scoring model and a window 706 for selecting content to which the scoring model applies.

Turning first to window 704, GUI 702 includes a GUI element 710 for selecting a first variable for the set of variables for the scoring model, a second GUI element 712 for selecting a second variable for the set of variables for the scoring model, and an Nth GUI element 714 for selecting an Nth variable for the set of variables for the scoring model. GUI 702 also includes a GUI element 716 for adding an additional variable for the set of variables for the scoring model. In the snapshot of FIG. 7, the GUI element 710 for selecting a first variable for the set of variables for the scoring model has a button 718 activated, which in turn results in displaying indicators for selectable variables. In this example, the displayed selectable indicators include an indicator 720 for "Variable 1", an indicator 722 for "Variable 2", an indicator 724 for "Variable 3", through an indicator 726 for "Variable N". A user may similarly select the second variable using GUI element 712 and the Nth variable using GUI element 714. Furthermore, in the event a user may wish to have the scoring model associated with a single variable, GUI elements 712 and 714 each also include a button for removing the GUI element.

GUI 702 also has boxes for entering weights for the variables. For instance, GUI has a box 730 for the first variable, a box 732 for the second variable, and a box 734 for the Nth variable.

Turning next to window 706, GUI 702 includes a GUI element 740 for selecting a first type of content to be associated with the scoring model, a second GUI element 742 for selecting a second type of content to be associated with the scoring model, and an Nth GUI element 744 for selecting an Nth type of content to be associated with the scoring model. GUI 702 also includes a GUI element 746 for adding an additional type of content to be associated with the scoring model. In the snapshot of FIG. 7, the GUI element 740 for a first type of content to be associated with the scoring model has a button 748 activated, which in turn results in displaying indicators for selectable content types. In this example, the displayed selectable indicators include an indicator 750 for "Content Type 1", an indicator 752 for "Content Type 2", an indicator 754 for "Content Type 3", through an indicator 756 for "Content Type N". A user may similarly select the second type of content using GUI element 742 and the Nth type of content using GUI element 744. Furthermore, in the event a user may wish to have the scoring model associated with a single content type, GUI elements 742 and 744 each also include a button for removing the GUI element.

Although not illustrated, the user interface may also include a GUI element for selecting a content-lifecycle stage that applies to the selected content.

Figure 8:
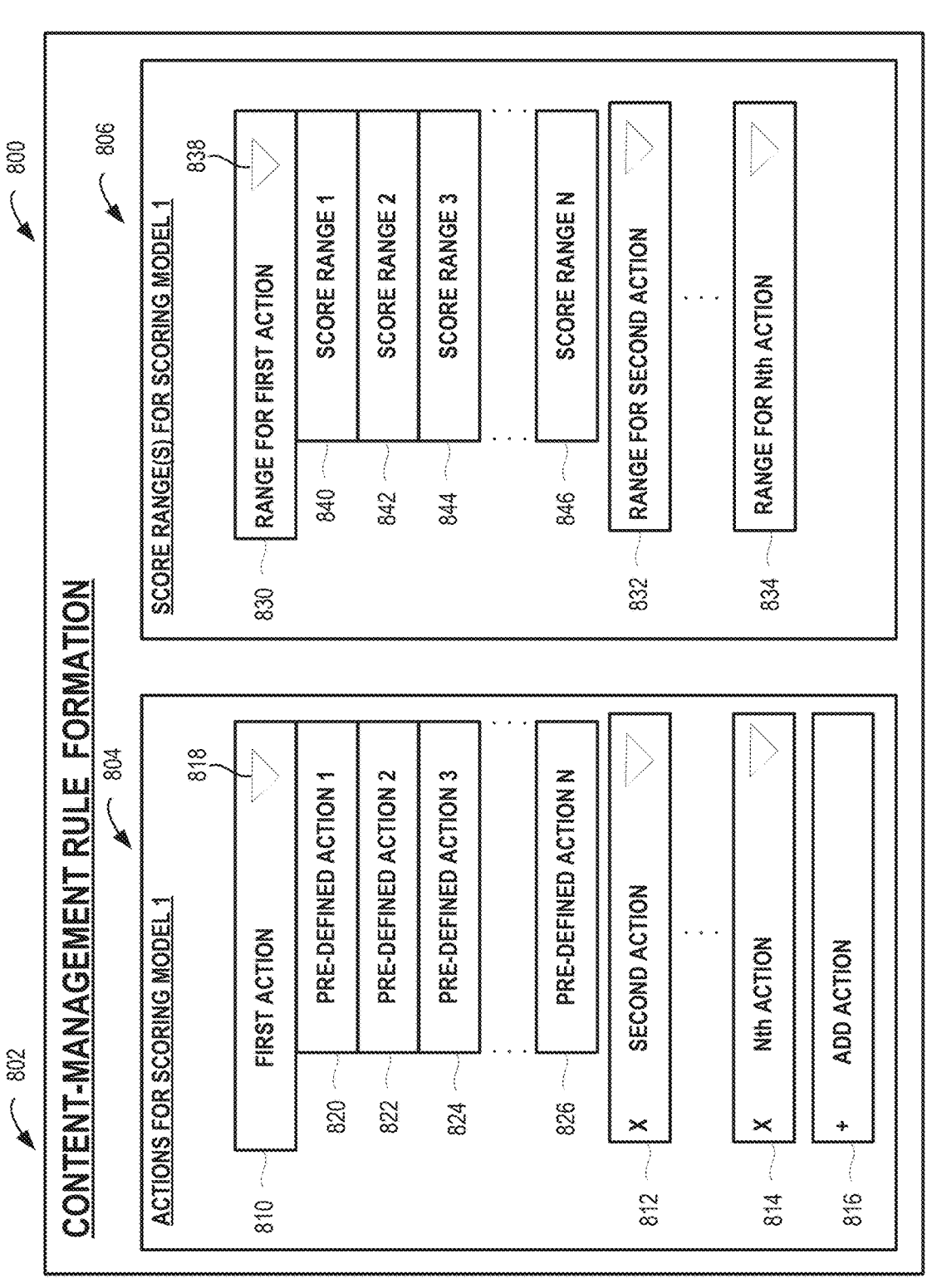
FIG. 8 depicts an example snapshot of a GUI that may be presented to a user, according to aspects of the disclosed technology.

One illustrative example of a user interface for defining rules associated with managing digital content based on the trustworthiness score generated by scoring models will now be shown and described with respect to FIG. 8, which illustrates a snapshot of GUI that may be presented by a given client device 108. In particular, snapshot 800 is an example snapshot of the illustrated GUI 802 that may be presented to a user as rules associated with managing digital content are being formed for a given scoring model. GUI includes a window 804 for selecting actions to be associated with the scoring model and a window 806 for selecting score ranges to be associated with the selected actions.

Turning first to window 804, GUI 802 includes a GUI element 810 for selecting a first action, a second GUI element 812 for selecting a second action, and an Nth GUI element 714 for selecting an Nth action. GUI 802 also includes a GUI element 816 for adding an additional action.

In the snapshot of FIG. 8, the GUI element 810 for selecting a first action has a button 818 activated, which in turn results in displaying indicators for selectable actions. In this example, the displayed selectable indicators include an indicator 820 for "Pre-defined Action 1", an indicator 822 for "Pre-defined Action 2", an indicator 824 for "Pre-defined Action 3", through an indicator 826 for "Pre-defined Action N". A user may similarly select the second action using GUI element 812 and the Nth action using GUI element 814.

Turning next to window 806, GUI 802 includes a GUI element 830 for selecting a score range to be associated with the first action, a second GUI element 832 for selecting a score range to be associated with the second action, and an Nth GUI element 834 for selecting score range to be associated with the Nth action.

In the snapshot of FIG. 8, the GUI element 830 for a score range to be associated with the first action has a button 818 activated, which in turn results in displaying indicators for selectable score ranges. In this example, the displayed selectable indicators include an indicator 840 for "Score Range 1", an indicator 842 for "Score Range 2", an indicator 844 for "Score Range 3", through an indicator 846 for "Score Range N". A user may similarly select a score range for the second action using GUI element 832 and score range for the Nth action using Nth GUI element 834.

Figure 9:
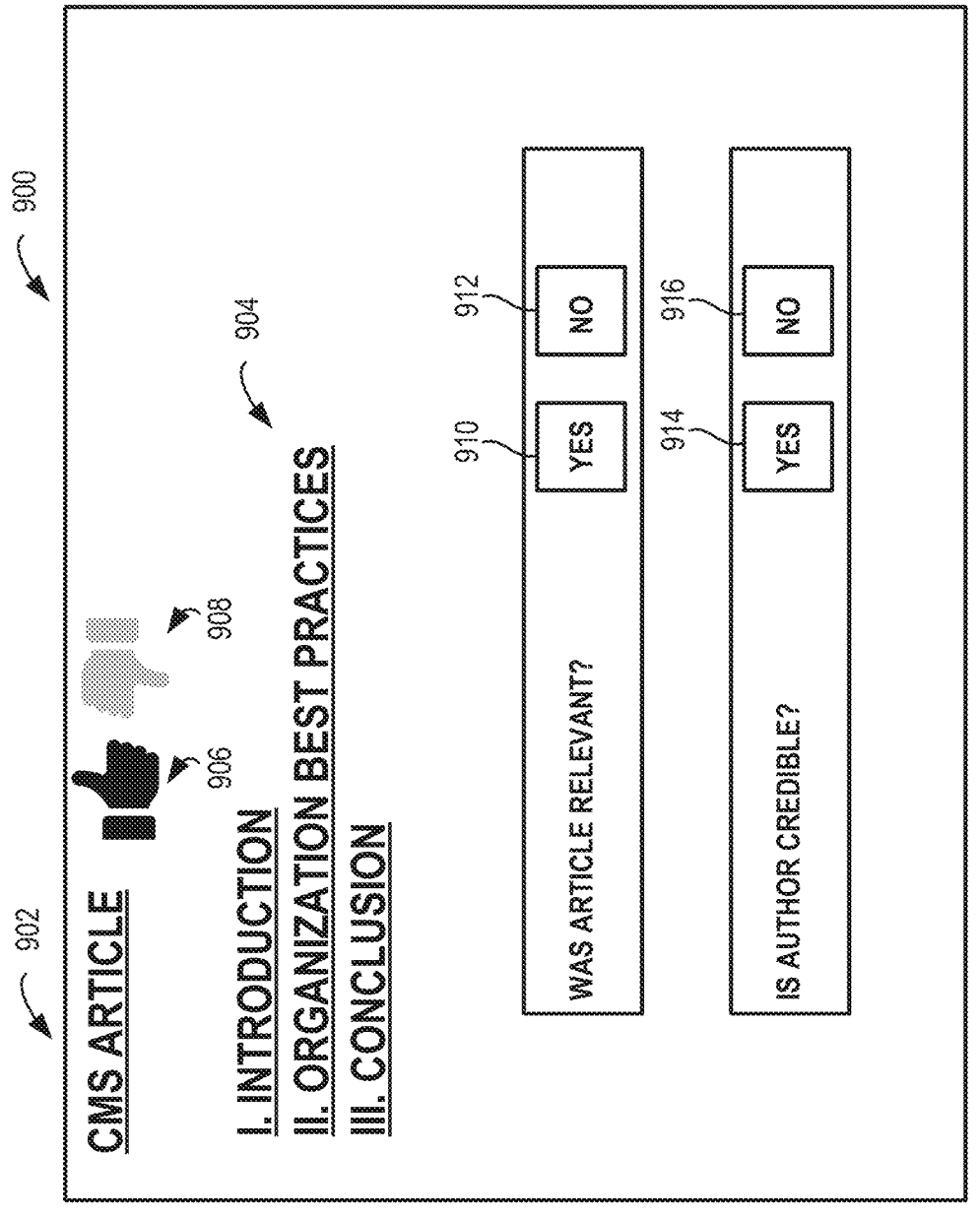
FIG. 9 depicts an example snapshot of a GUI that may be presented to a user, according to aspects of the disclosed technology.

One illustrative example of a user interface for collecting user feedback related to a piece of content will now be shown and described with respect to FIG. 9, which illustrates a snapshot of GUI that may be presented by a given client device 108. In particular, snapshot 900 is an example snapshot of the illustrated GUI 902 that may be presented to a user to present a given piece of content together with GUI elements that allow a user to provide feedback regarding the content. More particularly, GUI includes a presentation 904 of the piece of content. The presentation of content may take any suitable form. For simplicity, in this example the presentation 904 of the piece of content includes hyperlinks to various sections of the piece of content. However, this is a representative example only and other presentations of content are possible as well.

Further, GUI 902 includes numerous selectable indicators for providing user feedback. In particular, GUI 902 includes (i) a selectable indicator 906 for a user indicating that they like the content, (ii) a selectable indicator 908 for a user indicating that they do not like the content, (iii) a selectable indicator 910 for a user indicating that they consider the article relevant, (iv) a selectable indicator 912 for a user indicating that they do not consider the article relevant, (v) a selectable indicator 914 for a user indicating that they consider the author credible, and (v) a selectable indicator 916 for a user indicating that they do not consider the author credible. Other selectable indicators for other user feedback are possible as well.

In an example, back-end computing platform 102 may be configured to cause the given piece of content to be presented by client device 108 together with the GUI elements that allow a user of the client device to provide feedback regarding the given piece of content prior to using the given scoring model to evaluate the given piece of content.

Figure 10:
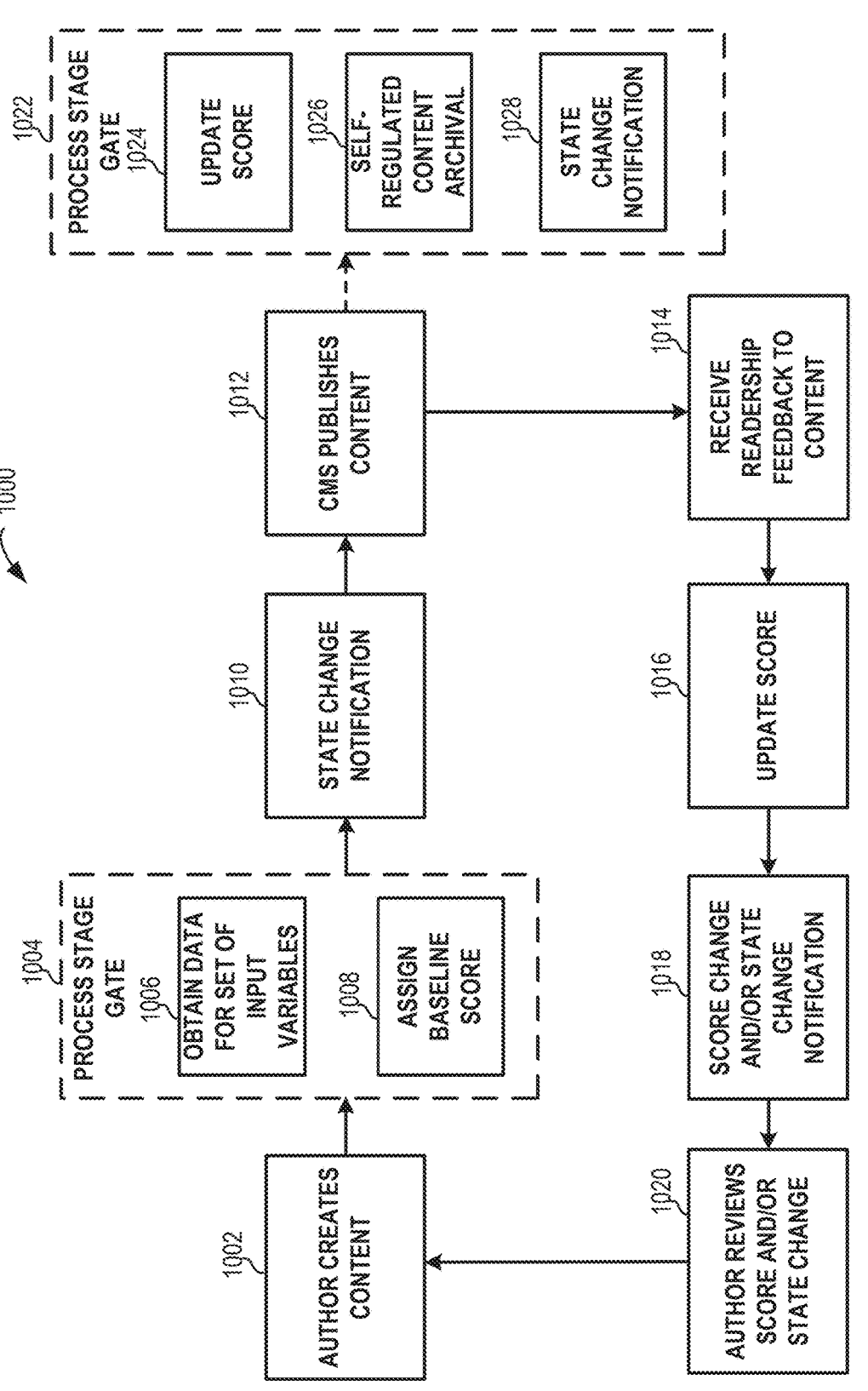
FIG. 10 depicts a conceptual illustration of an example process flow associated with a given piece of content hosted within a CMS, according to aspects of the disclosed technology.

Turning now to FIG. 10, an example process flow 1000 associated with a given piece of content (e.g., an article) hosted within a CMS of an organization is shown. At block 1002, an author creates a piece of content. At block 1004, the piece of content goes through a first process stage gate that determines whether the piece of content should proceed to a publication stage based on a first scoring model that was created and deployed in accordance with the disclosed technology. This process stage gate may involve, at block 1006, obtaining data about the piece of content for a set of variables associated with the first scoring model. Further, at block 1008, the data may be input into the first scoring model to determine a baseline trustworthiness score for the piece of content.

In the event that the baseline trustworthiness score is above a threshold (e.g., a threshold defined in a content-management rule associated with the first scoring model), back-end computing platform 102 may determine that the piece of content is to be advanced to a publication stage. Based on this determination, at block 1010, back-end computing platform 102 may send a state change notification to the author that the content has advanced to the publication stage, and at block 1012, back-end computing platform 102 may publish the content.

After the piece of content is published, reads may read the piece of content and also provide user feedback. At block 1014, back-end computing platform 102 receives user feedback for the piece of content. At block 1016, back-end computing platform 102 may then update the trustworthiness score for the piece of feedback to account for this user feedback as well as any other updates that may impact the trustworthiness score, such as updates to the piece of content's age, citation history, etc. In this way, the trustworthiness score for the piece of content may change over time. At block 1018, back-end computing platform 102 may send a notification to the author of the score change. Additionally, to the extent that the updated trustworthiness score warrants a change in the state of the piece of content, back-end computing platform 102 may effect that state change and notify the author of the content about that state change.

At block 1020, the author may review the updated score and/or state change. Based on the review, the author may determine whether updated or new content is needed. The process may then return to block 1002, in which the author may update the content or create a new piece of content. As discussed above, this may help the author (i) determine content needs and/or desires within the organization and (ii) tailor the content they create to those needs and/or desires within the organization.

Furthermore, after publication at block 1012, the piece of content may periodically be evaluated in accordance with a second process stage gate 1022 that determines whether the piece of content should proceed to an archive stage based on a second scoring model that was created and deployed in accordance with the disclosed technology. The second process stage gate 1022 may involve, at block 1024, back-end computing platform 102 using the second scoring model to update the trustworthiness score for the piece of content and then evaluating whether the piece of content satisfies a content-management rule for archiving (e.g., a rule with conditions based on both trustworthiness score and age). Based on that evaluation, at block 1026, back-end computing platform 102 may archive the piece of content. In this manner, back-end computing platform may provide a self-regulated content archival process for content hosted by the CMS. The content archival process is thus automated by back-end computing platform 102 based on the trustworthiness score output by the second scoring model-which synthesizes various information about the piece of content (e.g., author information, user feedback, citation history, etc.) into an actionable metric—and perhaps also other information about the piece of content that may be considered separately from the trustworthiness score (e.g., age). Further, in response to archiving the piece of content, back-end computing platform 102 may, at block 1028, send a state change notification to the author.

Figure 11:
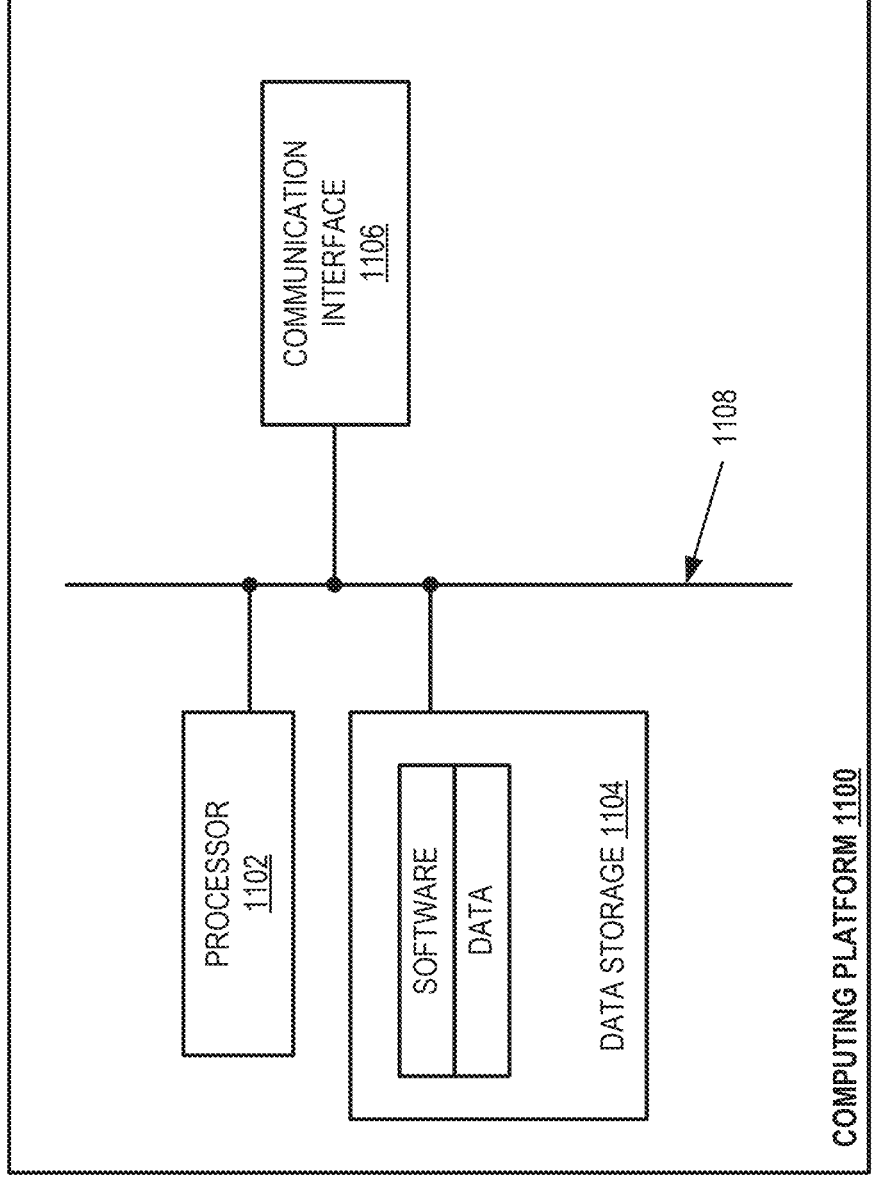
FIG. 11 is a simplified block diagram that illustrates some structural components of an example computing platform.

Turning now to FIG. 11, a simplified block diagram is provided to illustrate some structural components that may be included in an example computing platform 1100, which may be configured to host and execute the new software technology disclosed herein, such as the scoring-and-management software subsystem 304. At a high level, the computing platform 1100 may generally comprise any one or more computing systems that collectively include at least a processor 1102, data storage 1104, and a communication interface 1106, all of which may be communicatively linked by a communication link 1108 that may take the form of a system bus, a communication network such as a public, private, or hybrid cloud, or some other connection mechanism. Each of these components may take various forms.

Processor 1102 may comprise one or more processing components, such as general-purpose processors (e.g., a single- or multi-core a central processing unit (CPU)), special-purpose processors (e.g., a graphics processing unit (GPU), application-specific integrated circuit, or digital-signal processor), programmable logic devices (e.g., a field programmable gate array), controllers (e.g., microcontrollers), and/or any other processor components now known or later developed. In line with the discussion above, it should also be understood that processor 1102 could comprise processing components that are distributed across a plurality of physical computing devices connected via a network, such as a computing cluster of a public, private, or hybrid cloud.

In turn, data storage 1104 may comprise one or more non-transitory computer-readable storage mediums that are collectively configured to store (i) program instructions that are executable by processor 1102 such that computing platform 1100 is configured to perform some or all of the disclosed functions, and (ii) data that may be received, derived, or otherwise stored by computing platform 1100 in connection with the disclosed functions. In this respect, the one or more non-transitory computer-readable storage mediums of data storage 1104 may take various forms, examples of which may include volatile storage mediums such as random-access memory, registers, cache, etc. and non-volatile storage mediums such as read-only memory, a hard-disk drive, a solid-state drive, flash memory, an optical-storage device, etc. In line with the discussion above, it should also be understood that data storage 1104 may comprise computer-readable storage mediums that are distributed across a plurality of physical computing devices connected via a network, such as a storage cluster of a public, private, or hybrid cloud. Data storage 1104 may take other forms and/or store data in other manners as well.

Communication interface 1106 may be configured to facilitate wireless and/or wired communication with client devices (e.g., one or more client devices 108 of FIG. 1) and/or third-party computing platforms. Additionally, in an implementation where the computing platform 1100 comprises a plurality of physical computing devices connected via a network, communication interface 1106 may be configured to facilitate wireless and/or wired communication between these physical computing devices (e.g., between computing and storage clusters in a cloud network). As such, communication interface 1106 may take any suitable form for carrying out these functions, examples of which may include an Ethernet interface, a serial bus interface (e.g., Firewire, USB 3.0, etc.), a chipset and antenna adapted to facilitate wireless communication, and/or any other interface that provides for any of various types of wireless communication (e.g., Wi-Fi communication, cellular communication, short-range wireless protocols, etc.) and/or wired communication. Communication interface 1106 may also include multiple communication interfaces of different types. Other configurations are possible as well.

Although not shown, the computing platform 1100 may additionally include or have an interface for connecting to one or more user-interface components that facilitate user interaction with the computing platform 1100, such as a keyboard, a mouse, a trackpad, a display screen, a touch-sensitive interface, a stylus, a virtual-reality headset, and/or one or more speaker components, among other possibilities.

It should be understood that the computing platform 1100 is one example of a computing platform that may be used with the embodiments described herein. Numerous other arrangements are possible and contemplated herein. For instance, in other embodiments, the computing platform 1100 may include additional components not pictured and/or more or fewer of the pictured components.

Example embodiments of the disclosed innovations have been described above. Those skilled in the art will understand, however, that changes and modifications may be made to the embodiments described without departing from the true scope and spirit of the present invention, which will be defined by the claims. For instance, those in the art will understand that the disclosed technology for scoring and managing digital content may be implemented in areas other than for purposes of a CMS.

Further, to the extent that examples described herein involve operations performed or initiated by actors, such as "humans," "operators," "users" or other entities, this is for purposes of example and explanation only. The claims should not be construed as requiring action by such actors unless explicitly recited in the claim language.

The invention claimed is:

1. A computing platform comprising:
a communication interface;
at least one processor;
at least one non-transitory computer-readable medium; and
program instructions stored on the at least one non-transitory computer-readable medium that are executable by the at least one processor to cause the computing platform to:
    cause at least one client device to present a user interface for creating at least one scoring model that is configured to assess trustworthiness of content hosted within a content management system (CMS);
    receive, from the at least one client device, data defining (i) a first scoring model that is configured to output a first trustworthiness score for a piece of content based on an evaluation of data for a first set of input variables and (ii) a second scoring model that is configured to output a second trustworthiness score for a piece of content based on an evaluation of data for a second set of input variables that differs from the first set of input variables;
    while a given piece of content hosted within the CMS is at a first stage in a content lifecycle, use the first scoring model to evaluate the given piece of content by (i) obtaining data for the first set of input variables and (ii) inputting the obtained data into the first scoring model and thereby determining a given first trustworthiness score for the given piece of content;
    while the given piece of content is at a second stage in the content lifecycle that is subsequent to the first stage, use the second scoring model to evaluate the given piece of content by (i) obtaining data for the second set of input variables and (ii) inputting the obtained data into the second scoring model and thereby determining a given second trustworthiness score for the given piece of content; and
    based on the given first and second trustworthiness scores for the given piece of content, manage the given piece of content.

2. The computing platform of claim 1, wherein the given first and second sets of input variables each comprise one or more of:
one or more variables indicating information derived from the given piece of content itself;
one or more variables indicating information derived from user feedback;
one or more variables indicating information derived based on an author of the given piece of content;
one or more variables indicating information derived from other content hosted within the CMS; or
one or more variables indicating information derived using an application programming interface (API).

3. The computing platform of claim 1, wherein the program instructions that are executable by the at least one processor to cause the computing platform to, based on the given first and second trustworthiness scores for the given piece of content, manage the given piece of content comprise program instructions stored on the at least one non-transitory computer-readable medium that are executable by the at least one processor to cause the computing platform to:
based on the given first trustworthiness score for the given piece of content, determine whether to advance the given piece of content beyond the first lifecycle stage; and
based on the given second trustworthiness score for the given piece of content, determine whether to advance the given piece of content beyond the second lifecycle stage.

4. The computing platform of claim 1, wherein:
the first scoring model's evaluation of data for the first set of input variables comprises applying a corresponding weight to each of the input variables of the first set of input variables; and
the second scoring model's evaluation of data for the second set of input variables comprises applying a corresponding weight to each of the input variables of the second set of input variables.

5. The computing platform of claim 1, further comprising program instructions that are executable by the at least one processor to cause the computing platform to:
prior to using the second scoring model to evaluate the given piece of content hosted within the CMS, cause the given piece of content to be presented to one or more users together with graphical user interface (GUI) elements that allow the one or more users to provide feedback regarding the given piece of content, wherein the second set of input variables includes one or more input variables that are based on the feedback.

6. The computing platform of claim 1, wherein the first and second scoring models are each defined for use with a particular category of content that is hosted within the CMS.

7. The computing platform of claim 1, further comprising program instructions that are executable by the at least one processor to cause the computing platform to:
after using the first scoring model to evaluate the given piece of content and thereby determining the given first trustworthiness score for the given piece of content:
    (i) use the first scoring model to reevaluate the given piece of content hosted within the CMS and thereby determine an updated first trustworthiness score for the given piece of content; and (ii) based on the updated first trustworthiness score for the given piece of content, further manage the given piece of content.

8. The computing platform of claim 1, further comprising program instructions that are executable by the at least one processor to cause the computing platform to:

transmit, to a second client device, a data communication regarding the given piece of content and thereby cause one or both of the given first or second trustworthiness scores to be presented by the second client device together with the given piece of content.

9. The computing platform of claim 1, further comprising program instructions that are executable by the at least one processor to cause the computing platform to:

expose one or both of the given first or second trustworthiness scores via an application programming interface (API).

10. The computing platform of claim 1, further comprising program instructions that are executable by the at least one processor to cause the computing platform to:

use one or both of the given first or second trustworthiness scores as a basis for determining an eminence score for an author of the given piece of content.

11. The computing platform of claim 1, further comprising program instructions that are executable by the at least one processor to cause the computing platform to define one or more rules associated with managing digital content based on trustworthiness scores output by one or both of the first or second scoring models, and wherein the program instructions that are executable by the at least one processor to cause the computing platform to, based on the given first or second trustworthiness scores for the given piece of content, manage the given piece of content comprise program instructions stored on the at least one non-transitory computer-readable medium that are executable by the at least one processor to cause the computing platform to:

manage the given piece of content in accordance with one or more of the defined one or more rules.

12. A non-transitory computer-readable medium, wherein the non-transitory computer-readable medium is provisioned with program instructions that, when executed by at least one processor, cause a computing platform to:

cause at least one client device to present a user interface for creating at least one scoring model that is configured to assess trustworthiness of content hosted within a content management system (CMS);

receive, from the at least one client device, data defining (i) a first scoring model that is configured to output a first trustworthiness score for a piece of content based on an evaluation of data for a first set of input variables and (ii) a second scoring model that is configured to output a second trustworthiness score for a piece of content based on an evaluation of data for a second set of input variables that differs from the first set of input variables;

while a given piece of content hosted within the CMS is at a first stage in a content lifecycle, use the first scoring model to evaluate the given piece of content by (i) obtaining data for the first set of input variables and (ii) inputting the obtained data into the first scoring model and thereby determining a given first trustworthiness score for the given piece of content;

while the given piece of content is at a second stage in the content lifecycle that is subsequent to the first stage, use the second scoring model to evaluate the given piece of content by (i) obtaining data for the second set of input variables and (ii) inputting the obtained data into the second scoring model and thereby determining a given second trustworthiness score for the given piece of content; and based on the given first and second trustworthiness scores for the given piece of content, manage the given piece of content.

13. The non-transitory computer-readable medium of claim 12, wherein the first and second sets of input variables each comprise one or more of:

one or more variables indicating information derived from the given piece of content itself;

one or more variables indicating information derived from user feedback;

one or more variables indicating information derived based on an author of the given piece of content;

one or more variables indicating information derived from other content hosted within the CMS; or one or more variables indicating information derived using an application programming interface (API).

14. The non-transitory computer-readable medium of claim 12, wherein the program instructions that, when executed by the at least one processor, cause the computing platform to, based on the given first and second trustworthiness scores for the given piece of content, manage the given piece of content comprise program instructions that, when executed by the at least one processor, cause the computing platform to:

based on the given first trustworthiness score for the given piece of content, determine whether to advance the given piece of content beyond the first lifecycle stage; and based on the given second trustworthiness score for the given piece of content, determine whether to advance the given piece of content beyond the second lifecycle stage.

15. The non-transitory computer-readable medium of claim 12, wherein:

the first scoring model's evaluation of data for the first set of input variables comprises applying a corresponding weight to each of the input variables of the first set of input variables; and the second scoring model's evaluation of data for the second set of input variables comprises applying a corresponding weight to each of the input variables of the second set of input variables.

16. The non-transitory computer-readable medium of claim 12, wherein the non-transitory computer-readable medium is further provisioned with program instructions that, when executed by at least one processor, cause the computing platform to:

within the CMS, cause the given piece of content to be presented to one or more users together with graphical user interface (GUI) elements that allow the one or more users to provide feedback regarding the given piece of content, wherein the second set of input variables includes one or more input variables that are based on the feedback.

17. A method carried out by a computing platform, the method comprising:

causing at least one client device to present a user interface for creating at least one scoring model that is configured to assess trustworthiness of content hosted within a content management system (CMS);

receiving, from the at least one client device, data defining (i) a first scoring model that is configured to output a first trustworthiness score for a piece of content based on an evaluation of data for a first set of input variables and (ii) a second scoring model that is configured to output a second trustworthiness score for a piece of content based on an evaluation of data for a second set of input variables that differs from the first set of input variables;

while a given piece of content hosted within the CMS is at a first stage in a content lifecycle, using the first scoring model to evaluate the given piece of content by (i) obtaining data for the first set of input variables and (ii) inputting the obtained data into the first scoring model and thereby determining a given first trustworthiness score for the given piece of content;

while the given piece of content is at a second stage in the content lifecycle that is subsequent to the first stage, using the second scoring model to evaluate the given piece of content by (i) obtaining data for the second set of input variables and (ii) inputting the obtained data into the second scoring model and thereby determining a given second trustworthiness score for the given piece of content; and based on the given first and second trustworthiness scores for the given piece of content, managing the given piece of content.

18. The computing platform of claim 1, wherein the program instructions that are executable by the at least one processor to cause the computing platform to, based on the given first and second trustworthiness scores for the given piece of content, manage the given piece of content comprise program instructions stored on the at least one non-transitory computer-readable medium that are executable by the at least one processor to cause the computing platform to:

based on the given first trustworthiness score for the given piece of content, initiate a first user workflow or a first notification associated with the first lifecycle stage; and based on the given second trustworthiness score for the given piece of content, initiate a second user workflow or a second notification associated with the second lifecycle stage.

19. The computing platform of claim 1, wherein the program instructions that are executable by the at least one processor to cause the computing platform to, based on the given first and second trustworthiness scores for the given piece of content, manage the given piece of content comprise program instructions stored on the at least one non-transitory computer-readable medium that are executable by the at least one processor to cause the computing platform to:

based on at least one of the given first or second trustworthiness scores for the given piece of content, change a location where the given piece of content is published within an internet or intranet domain.

20. The computing platform of claim 1, wherein the program instructions that are executable by the at least one processor to cause the computing platform to, based on the given first and second trustworthiness scores for the given piece of content, manage the given piece of content comprise program instructions stored on the at least one non-transitory computer-readable medium that are executable by the at least one processor to cause the computing platform to:

based on at least one of the given first or second trustworthiness scores for the given piece of content, determine how the given piece of content is to be presented to readers.

* * * * *